(12) United States Patent
Doucet et al.

(10) Patent No.: US 6,571,205 B1
(45) Date of Patent: May 27, 2003

(54) METHOD AND APPARATUS FOR TRANSFERRING INFORMATION BETWEEN DEVICES USING A TAPE DRIVE

(75) Inventors: Jody Michel Doucet, Nepean (CA); Mark B. Nadeau, Nepean (CA); Lauria Elaine Blackwell, Nepean (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/348,868

(22) Filed: Jul. 7, 1999

(51) Int. Cl.[7] .............................................. G06F 9/455
(52) U.S. Cl. ............................. 703/24; 703/23; 703/25; 235/492; 360/77.13
(58) Field of Search ................................ 703/24, 23, 25; 360/77.04, 77.13, 77.01, 55, 79; 235/492

(56) References Cited

U.S. PATENT DOCUMENTS

| | | | | |
|---|---|---|---|---|
| 3,996,618 A | | 12/1976 | Suzuki ........................ 360/96 |
| 4,110,801 A | * | 8/1978 | Lemelson .................. 360/96.3 |
| 4,330,844 A | | 5/1982 | Dubuc ........................ 364/900 |
| 4,342,081 A | | 7/1982 | Dubuc ........................ 364/200 |
| 4,628,372 A | * | 12/1986 | Morisawa .................... 360/40 |
| 4,727,512 A | * | 2/1988 | Birkner et al. ................ 703/24 |
| 4,734,897 A | * | 3/1988 | Schotz .......................... 369/2 |
| 4,786,984 A | * | 11/1988 | Seeman ....................... 360/31 |
| 5,161,131 A | * | 11/1992 | Borchardt et al. .............. 369/1 |
| 5,321,817 A | * | 6/1994 | Feinstein ...................... 703/25 |
| 5,351,159 A | * | 9/1994 | Dodt et al. .................. 360/132 |
| 5,584,043 A | | 12/1996 | Burkart ....................... 395/882 |
| 5,654,854 A | * | 8/1997 | Mallary .................... 360/327.3 |
| 5,675,448 A | * | 10/1997 | Molstad et al. .......... 360/77.12 |
| 5,713,006 A | | 1/1998 | Shigeeda ............... 395/497.01 |
| 5,802,398 A | | 9/1998 | Liu et al. ..................... 395/882 |
| 5,841,628 A | | 11/1998 | Alpert et al. ................ 361/600 |
| 5,872,675 A | * | 2/1999 | Solhjell .................... 360/77.01 |
| 5,930,065 A | * | 7/1999 | Albrecht et al. ............ 360/72.2 |
| 5,944,574 A | * | 8/1999 | Small et al. ................. 446/149 |
| 5,978,163 A | * | 11/1999 | Cunningham ................ 360/66 |
| 6,018,434 A | * | 1/2000 | Saliba ...................... 360/77.13 |
| 6,021,013 A | * | 2/2000 | Albrecht et al. .............. 360/53 |
| 6,039,260 A | * | 3/2000 | Eisele ......................... 235/492 |
| 6,042,009 A | * | 3/2000 | Barrett et al. ................ 235/441 |
| 6,061,200 A | * | 5/2000 | Shepherd et al. ........ 360/77.04 |
| 6,067,481 A | * | 5/2000 | Saliba et al. ................. 700/214 |
| 6,089,459 A | * | 7/2000 | Eisele et al. ................. 235/492 |
| 6,151,188 A | * | 11/2000 | Takano et al. ................ 360/95 |

* cited by examiner

*Primary Examiner*—Samuel Broda
*Assistant Examiner*—Kandasamy Thangavelu

(57) ABSTRACT

A method and apparatus for transferring information between first and second devices, where the first device includes a tape drive having a tape drive head. A tape head interface is removably positionable adjacent the tape drive head to communicate with the tape drive head, and a communications interface communicates signals between the tape head interface and the second device. A tape emulator in communication with the tape head interface emulates a tape in the tape drive.

61 Claims, 18 Drawing Sheets

METHOD AND APPARATUS FOR TRANSFERRING INFORMATION BETWEEN DEVICES USING A TAPE DRIVE

FIELD OF THE INVENTION

This invention relates to data communications, and more particularly, to a method and apparatus employing a tape drive for transferring information between first and second devices, where at least one of the devices has the tape drive.

BACKGROUND OF THE INVENTION

In recent years, computer tape drives have become increasingly popular for data transfer and back-up purposes. For example, the proliferation of Quarter-Inch Cartridge (QIC) tape technology has resulted in sales of millions of QIC tape drives, either as peripheral devices or as integral components of desktop or larger computers. Similarly, many other types of equipment, such as telecommunications switches, for example, are often manufactured with integral tape drives.

Due to their large data-storage capacities, QIC tape cartridges have been increasingly used to transfer data or software updates to host computers or devices having QIC tape drives. However, this requires significant human intervention, since the tape cartridge containing the data must be delivered by hand and manually inserted into the tape drive. The inherent delays in such a procedure are further aggravated where the host computer is situated in a distant location. Such delays also arise when data from such a host computer is required elsewhere.

One approach to a similar problem has been to provide a magnetic tape drive emulator to act as an imaging interface between a computer system and a peripheral image processing system. The magnetic tape drive emulator is physically connected to a tape drive interface bus, between a tape formatter and a tape drive system. However, such a physical connection is invasive to the hardware of the tape drive and its host computer, and may potentially be destructive to data. Government regulations may also limit the changes that can be made to equipment. Moreover, this procedure is inconvenient, particularly if the tape drive is an integral component of the host computer, in which case the host computer would have to be taken apart in order to connect the magnetic tape drive emulator to the tape drive bus.

Thus, there is a need for a convenient and non-invasive way to effect data communications between a host computer having a tape drive and a remote computer or device.

SUMMARY OF THE INVENTION

The present invention addresses the above need by providing an apparatus and method for using a tape drive for transferring information between first and second devices where the tape drive is included within at least one of the first and second devices. The apparatus and/or method allow a first device such as a host computer having a conventional tape drive to use the tape drive to achieve bidirectional or unidirectional data transfer between the host computer and a second device such as a remote computer, for example. This is accomplished by positioning a removable tape head interface adjacent the tape drive head, communicating signals between the tape drive head and the tape head interface, communicating signals between the tape head interface and the second device, and emulating a tape in the tape drive.

An apparatus for achieving this includes a tape head interface removably positionable adjacent the tape drive head to communicate with the tape drive head, a communications interface for communicating signals between the tape head interface and the second device, and a tape emulator in communication with the tape head interface for emulating a tape in the tape drive. The tape head interface preferably includes a transducer for transducing signals between the tape drive head and the tape head interface.

In one embodiment, the tape head interface has an outer housing shaped generally like a conventional tape cartridge, so that it is removably insertable into the conventional tape drive. A thin cable such as a flat ribbon cable is used to communicate signals between the tape head interface and the second device.

Once inserted into the conventional tape drive, the tape head interface mimics a tape cartridge. When the host computer attempts to read data from the tape, the tape head interface produces data signals which mimic the signals produced by a conventional magnetic tape, and which are received and interpreted by the tape drive as data on an actual tape. Conversely, when the host computer attempts to write to a tape, the data signals produced by the conventional tape drive head are received by the tape head interface and then communicated to the second device by any suitable data communication system which may include the public switched telephone network, for example.

Mimicking or emulating a tape in the tape drive, may include actuating tape position sensors in the tape drive to simulate tape position conditions. This may be achieved by use of a tape position indicator simulator, which in one embodiment directs radiation, such as light toward light sensors in the tape drive normally used for detecting holes punched in a tape.

In one embodiment, a tape drive movement detector is in communication with the tape head interface for detecting movement of a tape interface mechanism of the tape drive, and a processor circuit is in communication with the tape drive movement detector for controlling communication between the tape drive head and the tape head interface in response to signals received from the tape drive movement detector.

The processor circuit may be programmed to control the tape head interface to produce edge seek response signals for reception by the tape drive head when a first pre-defined position of the tape drive head relative to the tape head interface is detected by a tape drive head position detector.

In accordance with another aspect of the invention, there is provided an apparatus including a tape drive for communicating with a first device, a tape head interface removably positionable adjacent a tape drive head of the tape drive to communicate with the tape drive head, a communications interface in communication with the tape head interface for communicating signals between the tape head interface and a second device, and a tape emulator in communication with the tape head interface, for emulating a tape in the tape drive.

The present invention allows a host device to use a tape drive to achieve bidirectional or unidirectional data transfer with a remote device, without electrical connection to any part of the tape drive. Thus, the apparatus and method according to the embodiments of the invention, are non-invasive to existing hardware. Thus a tape cartridge or an apparatus according to an embodiment of the invention, can interchangeably be used in a conventional tape drive. Where the remote device is connected to a local or wide area network, the host computer or device is able to access an essentially unlimited amount of data through its tape drive, without the need to remove one tape cartridge and insert another. In this manner, periodic software updates may be uploaded from the network through the tape drive of the host computer, eliminating the need to manually deliver and insert a tape cartridge.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate various embodiments of the invention.

DETAILED DESCRIPTION

System

Figure 1:
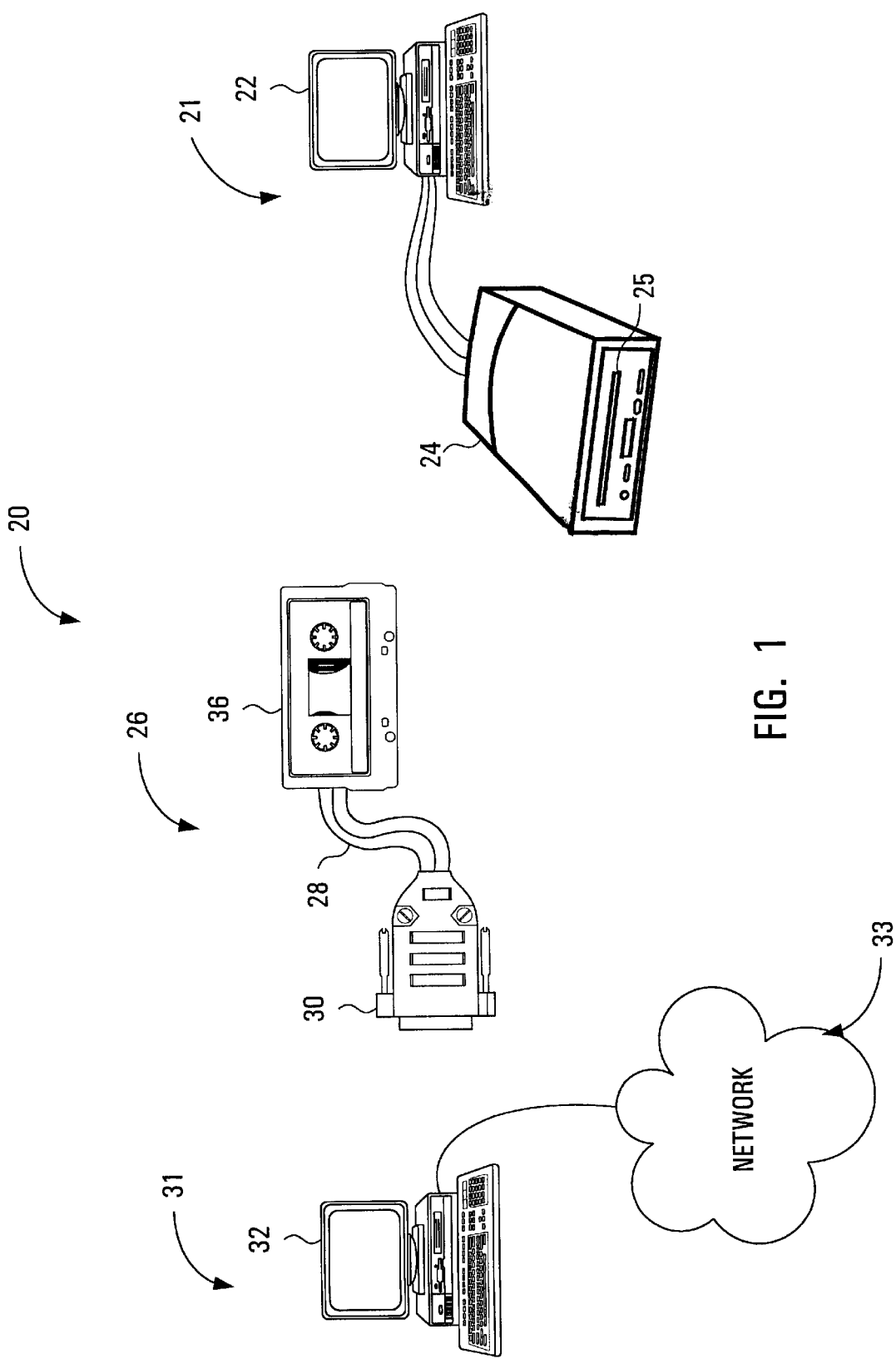
FIG. 1 is a schematic diagram of a system for transferring information between first and second devices, according to a first embodiment of the invention.

As shown in FIG. 1, a system for transferring information between first and second devices, according to a first embodiment of the invention, includes first and second devices 21 and 31 which, in this embodiment, include first and second computers 22 and 32 respectively. Alternatively, the first and/or second device may include a telecommunications switch having a tape drive, for example. The first and second devices may be located near each other, or remotely of each other, in separate cities, for example.

The first computer 22 has a tape drive 24, which in this embodiment, is a 525 MB Tandberg TDC 3820, compliant with a quarter inch cartridge (QIC) development standard. Alternatively, however, any suitable tape drive may be substituted therefor.

The system further includes a tape drive interface (TDI) 26 including a housing 36, a cable 28 and a connector 30. The connector 30 may be connected directly to the second computer 32, if the second computer is nearby or alternatively, it may be connected to a communications network such as shown at 33. The communications network may be a wide area network, for example, and such wide area network may make use of the public switched telephone network, for example.

Figure 2:
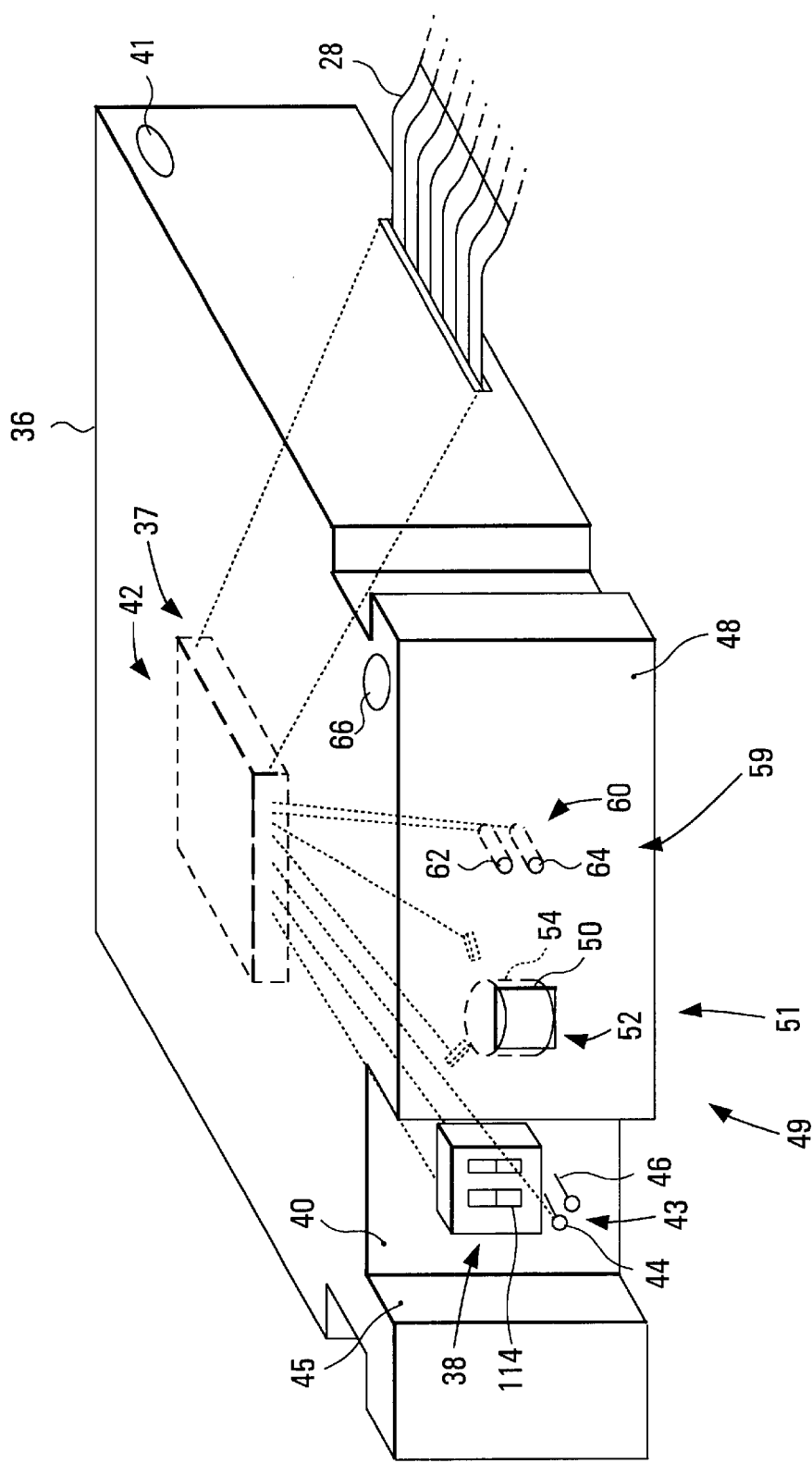
FIG. 2 is a perspective view of a tape drive interface of the system shown in FIG. 1.

Referring to FIGS. 1 and 2, the tape drive interface 26 facilitates the transfer of information between the first and second devices 21 and 31 respectively. The tape drive interface includes a tape head interface 38 and a communications interface 37. The tape head interface 38 is mounted to a wall 40 of the housing 36 and the housing is dimensioned to be receivable within the tape drive 24 shown in FIG. 1, in the same manner that a conventional QIC tape cartridge is received in the drive. In this embodiment, the external dimensions of the housing 36 are substantially identical to those of a 5.25-inch form factor QIC data cartridge. Alternatively, however, the housing 36 may be dimensioned in accordance with a 3.5-inch form factor QIC minicartridge, or any other conventional tape form factor.

Figure 3:
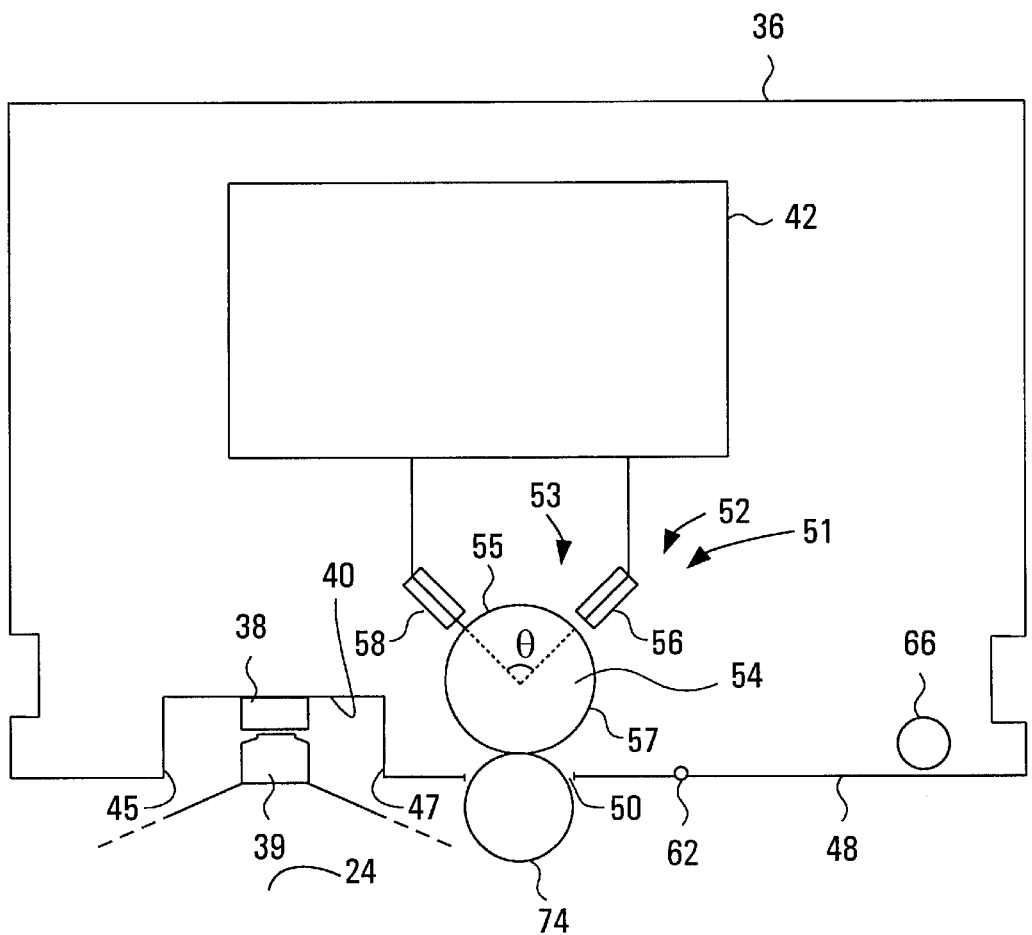
FIG. 3 is a plan view of the tape drive interface with its cover removed.

Referring to FIG. 3, the tape head interface 38 is positioned on the housing 36 such that the tape head interface is positioned adjacent a tape drive head 39 of the tape drive for communication with the tape drive head when the housing is received in the tape drive. By having the tape head interface 38 mounted on the housing 36, the tape head interface is thus removably positionable adjacent the tape drive head 39.

Referring to FIGS. 1 and 2, the communications interface 37 communicates signals between the tape head interface 38 and the second device 31. The communications interface therefore includes a cable 28, sufficiently thin to enable a door of the tape drive to close when the housing is placed in the tape drive or, in other words, when the tape head interface 38 is positioned adjacent the tape drive head 39. The inventor has found that one example of a sufficiently thin cable to facilitate closure of the door of the tape drive is a mylar ribbon cable having a thickness of 0.014 inches. The cable thus is operable to extend through an open gap between the door and the tape drive itself, the gap typically being approximately 0.016 inches. Generally however, any cable capable of extending through this gap or capable of extending from within the tape drive, while the housing is situated in the tape drive will be suitable for this purpose.

The TDI 26 further includes an upload/download switch 41, for selecting between an upload mode for uploading information from the second device 31 to the first device 21 via the tape drive 24, and a download mode for downloading information from the first device to the second device.

Also mounted within the housing 36 is a tape drive movement detector shown generally at 49 for detecting movement of a tape interface mechanism of the tape drive and a tape emulator shown generally at 59 for emulating a tape in the tape drive.

The tape drive movement detector 49 serves to determine the position of the tape drive head 39 relative to the tape head interface 38 and to detect engagement of a tape transport mechanism of the tape drive. The tape emulator 59 serves to send signals to tape position sensors of the tape drive, such that signals such as those created by flash sequences produced by holes punched in a conventional tape are transmitted to the tape position sensors of the tape drive.

Further mounted within the housing 36 is a processor circuit 42 which is connected to the tape head interface 38, the tape drive movement detector 49, the tape emulator 59 and the cable 28, for controlling communication between the tape drive head and the tape head interface in response to signals received from the tape drive movement detector. Effectively, the processor circuit 42 controls the tape head interface 38 to transmit or receive signals to or from the tape drive head 39 in response to tape drive movements detected by the tape drive movement detector 49 and controls the tape emulator 59 to signal the tape drive with appropriate signals representative of a tape position such as would be produced if a tape were positioned in the tape drive.

The tape drive movement detector 49 includes a tape drive head position detector 43 and a tape transport mechanism detector 51.

Tape Drive Head Position Detector

Referring to FIGS. 2 and 3, the tape drive head position detector is shown generally at 43. The tape drive head position detector detects a position of a tape drive head 39 of the tape drive 24 relative to the tape head interface 38, when the TDI 26 is inserted into the tape drive 24.

In this embodiment, the tape drive head position detector 43 includes first and second microswitches 44 and 46 in communication with the processor circuit 42. The first and second microswitches 44 and 46 protrude from the wall 40 of the housing 36, immediately below the tape head interface 38, and are spaced apart horizontally (longitudinally).

The first and second microswitches 44 and 46 have respective spring-loaded actuators, so that each actuator may be resiliently depressed in a downward direction (transverse to direction of motion of a hypothetical tape). The first microswitch 44 is positioned slightly higher than the second microswitch 46 relative to the tape head interface 38, by a vertical (transverse) distance roughly equal to the distance between a reference edge and a center of a lowest forward track (track 16) of a QIC-150 standard tape.

Whenever either of the actuators of the first and second microswitches 44 and 46 contacts the tape drive head 39 of the tape drive 24, the corresponding microswitch activates tape drive head position signals to the processor circuit 42.

When the tape drive head 39 of the tape drive 24 is in its lowest transverse position relative to the tape head interface 38, the tape drive head 39 will contact both the first and second microswitch 44 and 46 actuators, and thus the processor circuit 42 receives active tape drive head position signals from both the first and second microswitches 44 and 46, indicating the presence a first pre-defined position of the tape drive head 39 relative to the tape head interface.

As the tape drive head 39 of the tape drive 24 moves transversely upward relative to the tape head interface 38, the spring-loaded actuators of the first and second microswitches 44 and 46 will remain in contact with the tape drive head until the tape drive head reaches a height at which a forward read gap 108 of the tape drive head 39 would be centered about a reference edge of a hypothetical QIC-150 tape inserted into the tape drive. At this height, the second microswitch 46 actuator ceases to contact the tape drive head 39, and thus, the processor circuit 42 receives an active tape drive head position signal from the first microswitch 44 only, indicating a second pre-defined position of the tape drive head relative to the tape head interface.

As the tape drive head 39 of the tape drive 24 continues to move transversely upward relative to the tape head interface 38, the spring-loaded actuator of the first microswitch 44 remains in contact with the tape drive head until the tape drive head 39 reaches a height at which the forward read gap 108 of the tape drive head 39 would be centered about a lowest forward track (track 16) of a hypothetical QIC-150 tape inserted into the tape drive. At this height, the first microswitch 44 actuator ceases to contact the tape drive head 39, and thus, the processor circuit 42 no longer receives active tape drive head position signals from either of the microswitches, indicating a third pre-defined position of the tape drive head relative to the tape head interface has been achieved.

Alternatively, the first microswitch 44 of tape drive head position detector 43 may be omitted and an alternative timing-based initialization subroutine (not shown) may be invoked upon receiving a signal from the second microswitch 46 indicating that the tape drive head 39 has reached the first (lowest) pre-defined position. Thereafter, the processor circuit 42 is directed to control tape head interface 38 to produce edge seek response signals (discussed in greater detail below) at pre-determined times corresponding to the times at which the tape drive head 39 reaches the second and third pre-defined positions.

Figure 4:
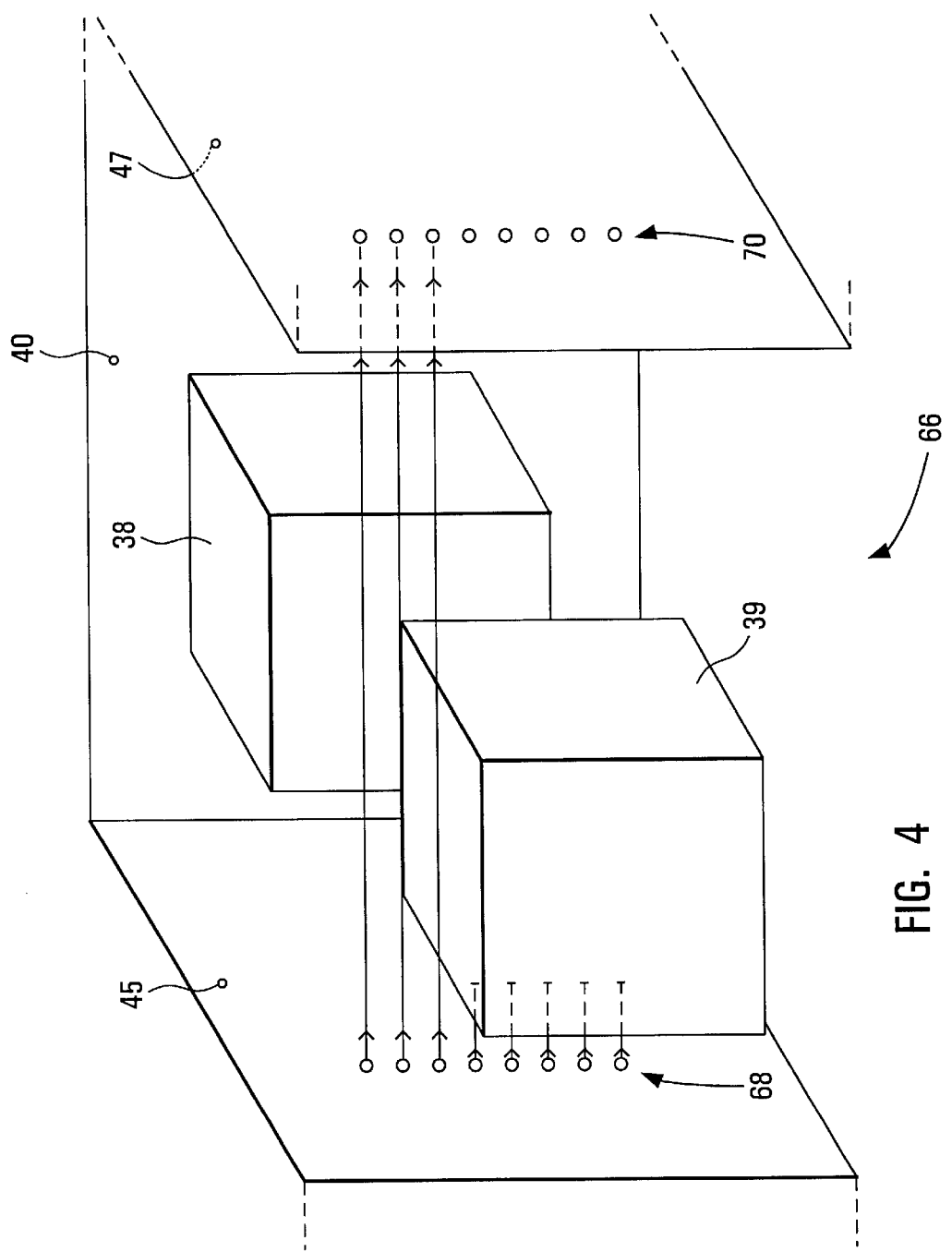
FIG. 4 is a schematic representation of a tape drive head position detector according to an alternative embodiment of the invention.

Referring to FIG. 4, a further alternative tape drive head position detector is shown generally at 66 in which there is provided a plurality of irradiance sources and a plurality of irradiance detectors, each of the irradiance detectors corresponding to a particular one of the plurality of irradiance sources. The plurality of irradiance sources is provided by a plurality of infrared (IR) laser diodes 68 mounted in a vertical line on a first transverse wall 45 of the housing 36. The plurality of irradiance detector includes a plurality of IR detectors 70 mounted on a second transverse wall 47 of the housing opposite the first transverse wall 45. Each of the plurality of IR laser diodes 68 projects collimated IR radiation toward a particular corresponding one of the IR detectors 70. The positioning and spacing between individual diodes is selected such that the tape drive head 39 of the tape drive 24 always interrupts the path of at least one IR laser beam, in either its highest or lowest transverse positions. The plurality of IR detectors 70 is in communication with the processor circuit 42, and produces tape drive head position signals representing the position of the tape drive head 39 of the tape drive 24 relative to the tape head interface 38.

Tape Transport Mechanism

Referring to FIGS. 2 and 3, the tape transport mechanism detector is shown generally at 51. The tape transport mechanism detector detects motion of a tape transport mechanism of the tape drive to determine the intended direction of tape movement produced by the tape drive. To facilitate this, in this embodiment, the tape transport mechanism detector includes a drive roller monitor 52. The drive roller monitor 52 includes a wheel 54, and a position encoder shown generally at 53 for determining a rotational position of the wheel 54. An opening 50 in the external wall 48 of the housing 36 is positioned so that when the TDI 26 is inserted into the tape drive 24, the wheel is positioned to remain in contact with a rubber covered drive roller 74 of the tape drive when the tape head interface is positioned adjacent the tape drive head.

The position encoder 53 includes a reflective outer semicircumferential surface 55 of the wheel 54 which is coated with a reflective substance, which in this embodiment is aluminum tape. An absorptive outer semicircumferential surface 57 of the wheel 54 is covered with an absorptive substance, which in this embodiment is tape No. 476 manufactured by the 3M Company of Minnesota, U.S.A. Thus, half of the outer surface of the wheel 54 is reflective and the other half is absorptive.

The position encoder 53 further includes first and second sensors 56 and 58, each of which is embodied in a focused infrared (IR) reflective assembly having an IR emitter and an IR detector in a single package. Each of the first and second sensors points radially inward toward the wheel 54, and each is located in close proximity to the wheel. The second sensor 58 is spaced apart from the first sensor 56 such that the angle θ formed between the first sensor, the center of the wheel and the second sensor is not equal to either zero or 180°. In this embodiment, the sensors are positioned such that the angle θ is approximately 90°.

When the tape drive 24 attempts to advance the "tape" in the forward direction, it will cause the rubber covered drive roller 74 to turn in a clockwise direction, thereby causing the wheel 54 to turn in a counterclockwise direction. As a leading edge of the reflective outer semicircumferential surface 55 passes the first sensor 56, the reflective outer semicircumferential surface will begin to reflect infrared radiation produced by the IR emitter of the first sensor 56 back to the IR detector of the first sensor. In response, the first sensor 56 will produce drive roller monitor signals receivable by the processor circuit 42. The first sensor will cease producing such signals one-half rotation later, when a leading edge of the absorptive outer semicircumferential surface 57 passes the first sensor. The second sensor 58 will similarly produce drive roller monitor signals whenever the infrared radiation which its IR emitter projects at the wheel 54 is reflected back to the second sensor by the reflective outer semicircumferential surface.

Thus, as the tape drive attempts to advance the tape in a forward direction, the drive roller monitor signals received by the processor circuit from the first sensor 56 will "lead" the drive roller monitor signals received from the second sensor 58 (or more precisely, the drive roller monitor signals received by the processor circuit from the first sensor 56 will be phase-shifted +90° relative to the signals received from the second sensor 58), thus indicating the direction in which the tape drive 24 is attempting to advance the tape. The frequency of the drive roller monitor signals of either of the sensors 56 and 58 is directly proportional to the speed at which the tape drive is attempting to advance the tape.

Conversely, if the tape drive 24 attempts to advance the tape in a reverse direction, the drive roller monitor signals produced by the second sensor 58 will be phase-shifted +90° relative to the signals produced by the first sensor 56, and will thus "lead" the signals produced by the first sensor 56.

Tape Emulator

Figure 5:
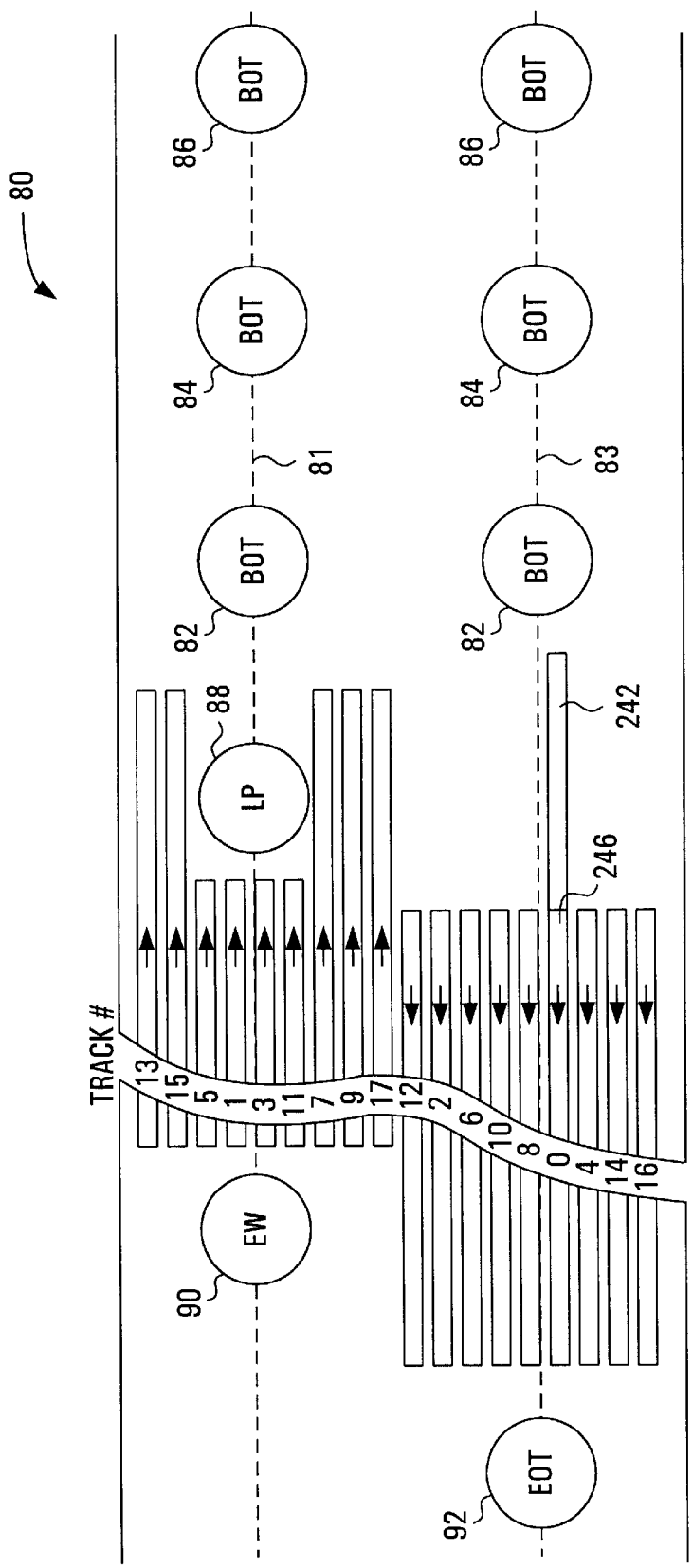
FIG. 5 is a schematic representation of tape position indicators on a tape, according to the prior art.

Referring to FIG. 5, a conventional tape complying with the QIC-150 standard (QIC-150-DC, Revision K, Jun. 20, 1991) is shown generally at 80. Position indicators on a QIC-150 tape are marked by physical holes punched through the tape, along an upper longitudinal row 81 and/or a lower longitudinal row 83 on the tape.

Referring to FIGS. 2 and 5, in this embodiment, the tape emulator 59 includes a tape position indicator simulator 60 mounted on the external wall 48 of the housing 36, for actuating tape position sensors in the tape drive to simulate tape position conditions. The tape position indicator simulator 60 includes first and second irradiance sources for directing radiation toward at least one of the tape position sensors. In this embodiment, the first and second irradiance sources include infrared light-emitting diodes (IR LEDs) 62 and 64 mounted on the external wall 48 of the housing 36 of the TDI 26. Both the first and second IR LEDs 62 and 64 are positioned in the same approximate longitudinal location of a reflector in a conventional QIC tape cartridge, so that when the TDI 26 is inserted into the tape drive 24, the IR LEDs are opposite an infrared emitter/detector assembly (not shown) of the tape drive 24. The first IR LED 62 is located in the same transverse position as the upper longitudinal row 81 on a conventional tape, while the second IR LED 64 is located in the transverse position of the lower longitudinal row 83 on such a tape. The first and second IR LEDs 62 and 64 are in communication with the processor circuit 42, which produces tape position simulator signals to cause the IR LEDs to produce flash sequences to simulate the various location indicators on a physical tape.

For example, to simulate a beginning of tape (BOT) marker 82 preceded by redundant BOT markers 84 and 86, shown in FIG. 5, the processor circuit 42 produces tape position simulator signals to cause the IR LEDs 62 and 64, shown in FIG. 2, to flash in unison three times in succession. Similarly, to simulate a load point (LP) marker 88 or an early warning (EW) marker 90, shown in FIG. 5, the processor circuit 42 causes the first IR LED 62 to flash once, and to simulate an end of tape (EOT) marker 92 and its two successive redundant EOT markers, the processor circuit causes the second IR LED 64 to flash three times.

In the above manner, the tape emulator 59 emulates signals received by an infrared emitter/detector assembly of the tape drive as if a tape cartridge were received in the tape drive.

Tape Head Interface

Figure 6:
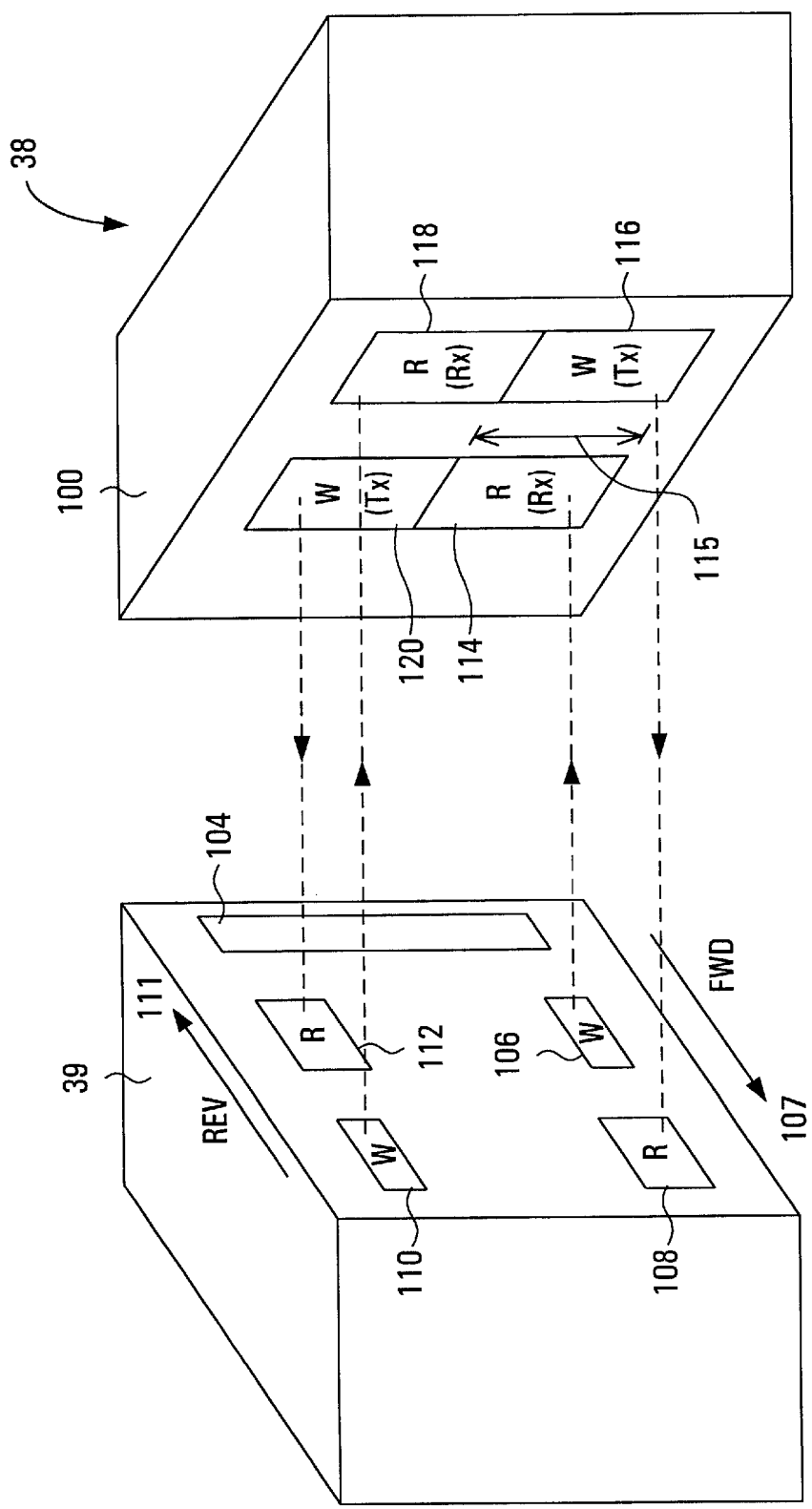
FIG. 6 is a schematic representation of a tape head interface of the tape drive interface shown in FIG. 2.

Referring to FIG. 6, the tape head interface is shown generally at 38. In this embodiment, the tape head interface 38 includes a transducer for transducing signals between the tape drive head and the tape head interface. More particularly, the transducer includes a flux transducer for producing electrical signals in response to magnetic flux transitions produced by the tape drive head to facilitate unidirectional communications at least, in sending information from the tape drive to the second device. Preferably, the flux transducer also produces magnetic flux transitions detectable by the tape drive head, in response to the electrical signals received from the communications interface to facilitate bidirectional communications between the tape drive and the second device. In this embodiment, such a flux transducer is provided by a custom magnetic head 100.

Conventionally, the tape drive head 39 of the tape drive 24 includes an erase gap 104, a forward write gap 106 for producing signals to write to forward tracks of a tape in a forward direction 107, a forward read gap 108 for reading from the forward tracks of the tape, a reverse write gap 110 for producing signals to write to the reverse tracks of the tape in a reverse direction 111, and a reverse read gap 112 for reading from the reverse tracks of the tape.

The custom magnetic head 100 includes a forward-read flux transducer 114 for receiving signals produced by the forward write gap 106 of the tape drive head 39, and includes a forward-write flux transducer 116 for producing signals receivable by the forward read gap 108 of the tape drive head 39. Similarly, the custom magnetic head 100 includes a reverse-read flux transducer 118 for receiving signals from the reverse write gap 110 of the tape drive head 39, and a reverse-write flux transducer 120 for producing signals receivable by the reverse read gap 112 of the tape drive head 39.

The flux transducers 114, 116, 118 and 120 differ from conventional transducers in a QIC tape drive head, primarily in that they are significantly elongated in a direction transverse to the length of a hypothetical QIC tape inserted into the drive. Specifically, the forward-read flux transducer 114 of the tape head interface 38 has a gap width 115, in a direction transverse to a hypothetical tape, sufficient to encompass the entire transverse (vertical) range of motion of the forward write gap 106 of the tape drive head 39. In other words, when the TDI 26 is inserted into the tape drive 24, write signals produced by the forward write gap 106 will always be received by the tape head interface 38 via the forward-read flux transducer 114, regardless of the position of the tape drive head 39. Similarly, each of the forward-write flux transducer 116, the reverse-read flux transducer 118 and the reverse-write flux transducer 120 has a transverse gap width sufficient to accommodate the entire transverse range of motion of the forward read gap 108, the reverse write gap 110 and the reverse read gap 112 respectively of the tape drive head 39. Thus each flux transducer 114, 116, 118 and 120 has a flux sensitivity area for communicating with the tape drive head over the entire range of transverse motion of a corresponding write or read gap of the tape drive head.

Figure 7:
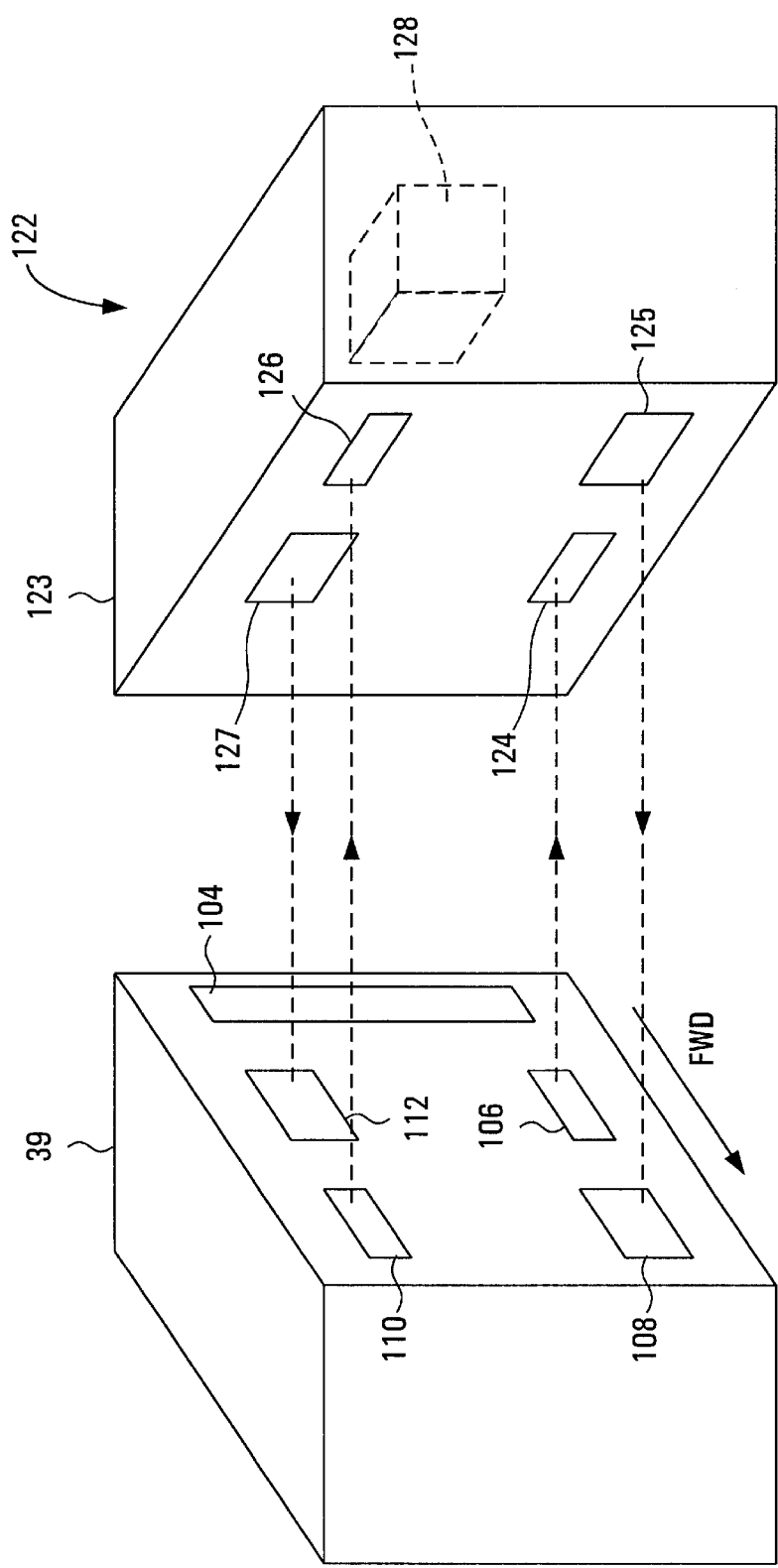
FIG. 7 is a schematic representation of a tape head interface according to an alternative embodiment of the invention.

Referring to FIG. 7, a tape head interface according to an alternative embodiment of the invention is shown generally at 122. The tape head interface 122 includes a flux transducer having spaced apart read and write flux sensitivity areas, and a transducer motion assembly 128 for maintaining a constant position of the flux transducer relative to the tape drive head. More particularly, the tape head interface 122 includes a transducer 123, which includes a forward-read flux transducer 124, a forward-write flux transducer 125, a reverse-read flux transducer 126 and a reverse-write flux transducer 127, for communicating with the forward write gap 106, the forward read gap 108, the reverse write gap 110 and the reverse read gap 112 respectively of the tape drive head 39 of the tape drive 24. Mounted within the TDI 26 immediately behind the tape head interface 122 is a transducer motion assembly 128 for moving the tape head interface in a transverse (vertical) direction. The transducer motion assembly 128 may include a stepper motor, or alternatively, a servo-controlled voice coil motor, for example. A processor circuit of the TDI 26 is programmed to accurately monitor the transverse position of the tape drive head 39 (using, for example, a variation of the tape drive head position detector 66 shown in FIG. 4), and to control the transducer motion assembly 128 to cause the tape head interface 122 to maintain a constant transverse position relative to the tape drive head 39 of the tape drive 24.

Processor Circuit

Figure 8:
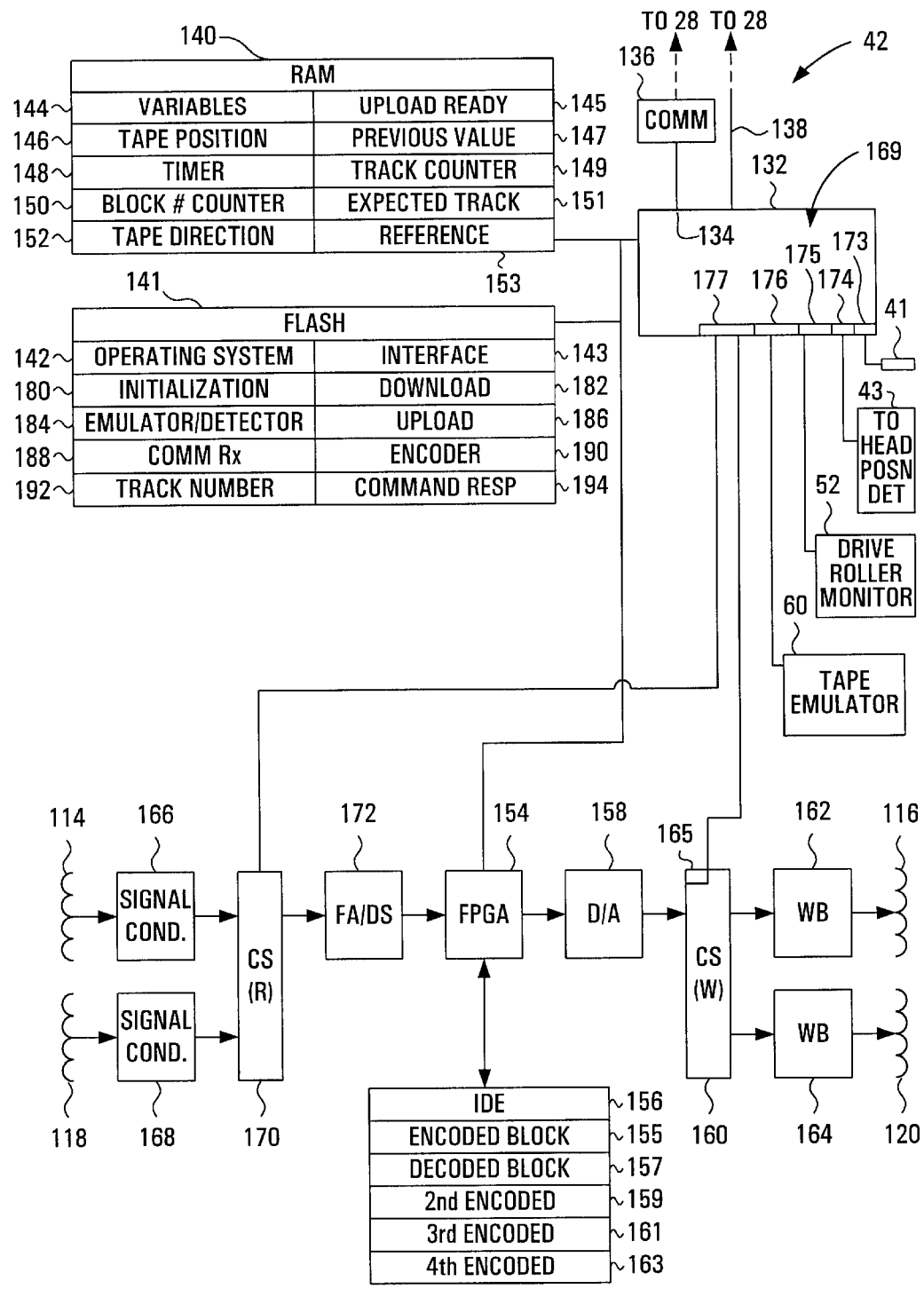
FIG. 8 is a block diagram of a processor circuit of the tape drive interface shown in FIG. 2.

Referring to FIG. 8, a block diagram of the processor circuit of the tape drive interface is shown generally at 42.

The processor circuit 42 includes a microprocessor 132. In this embodiment the microprocessor 132 includes a Motorola MC68EM360 with built-in Ethernet capability.

The microprocessor 132 has a communications (COMM) port 134 for communication with the second device 31 shown in FIG. 1. The COMM port 134 may be further connected to a communications circuit 136, which in this embodiment includes an MC68160 Ethernet Physical Layer Integrated Circuit. The communications circuit 136 is connected to the thin cable 28 shown in FIG. 1, which may facilitate connection to an Ethernet 10BaseT line of the network 33 shown in FIG. 1 and which also supplies power to the processor circuit 42 via a power line 138.

The microprocessor 132 is in further communication with memory devices which include a random access memory (RAM) 140 and a non-volatile memory, which in this embodiment is a FLASH memory 141. The FLASH memory 141 is programmed with blocks of codes for directing the microprocessor 132 to execute an operating system 142, which in this embodiment is VxWorks. The FLASH memory 141 is further programmed with blocks of codes for directing the microprocessor 132 to execute an interface routine 143.

The interface routine 143 defines in the RAM 140 a plurality of registers, including a variables register 144 for storing variables used by the microprocessor 132, an upload ready flag 145 for indicating whether the processor circuit 42 is ready to upload data to the tape drive (24), a tape position register 146 for storing a value representing a longitudinal position on a tape which the tape drive is attempting to address, a previous value register 147 for storing a code representing the previous states of the first and second sensors 56 and 58 of the drive roller monitor 52, a timer register 148 for storing a timer value, a track counter 149 for storing a value representing a track number of an encoded block which is to be sent to the tape drive 24, a block number counter 150 for storing a block number counter, an expected track counter 151 for storing a value representing a track number of a tape which the tape drive head currently intends to address, a tape direction register 152 for storing a value representing a direction of intended tape movement, and a reference register 153 for storing a reference track direction.

The FLASH memory 141 further contains blocks of instruction codes for directing the microprocessor 132 to execute an initialization subroutine 180 for simulating a response of a tape to an edge seek procedure, a download subroutine 182 for downloading information from the tape drive 24 to the second device 31, an emulator/detector thread 184 for determining a tape position intended to be addressed by the tape drive head 39 and for simulating tape position indicators, an upload subroutine 186 for uploading information from the second device 31 to the tape drive 24, a communications receive (COMM Rx) thread 188 for receiving information from the second device 31, an encoder subroutine 190 for encoding information received from the second device 31 for transmission to the tape drive head 39, a track number thread 192 for determining a track number of a tape which the tape drive head currently intends to address, and a command response subroutine 194 for responding to commands received from the second device 31.

The microprocessor 132 is also in communication with an arbiter circuit, which in this embodiment is a field programmable gate array (FPGA) 154. The FPGA 154 is used to control fast data transfer to and from an additional memory device, which in this embodiment includes an IDE hard drive 156. Alternatively, other suitable arbiter circuits may be substituted for the FPGA, and other memory devices may be substituted for the hard drive.

The interface routine 143 defines in the hard drive 156 an encoded block store 155 for storing encoded data which either has been written to the TDI 26 by the tape drive head 39 of the tape drive 24 or which will be written to the tape drive head 39 by the tape head interface 38.

The interface routine 143 also defines in the hard drive 156 a decoded data store 157 for storing decoded data blocks either received from the second device 31 or derived from encoded data blocks received from the tape drive head 39.

The interface routine 143 may further define in the hard drive 156 additional encoded block stores 159, 161 and 163 for storing additional tape-sized quantities of encoded data readable by the tape drive head 39 of the tape drive.

The FPGA 154 is also used to control read and write hardware which enables the TDI 26 to read data signals from and write data signals to the tape drive head of the tape drive respectively.

To enable the TDI 26 to "write" to the tape drive head 39 (i.e. to simulate a reading of an actual tape by the tape drive head 39), the FPGA 154 is connected to a digital to analog converter 158, which is connected to a write channel selector 160. The write channel selector 160 is connected to first and second write/bias circuits 162 and 164. In this embodiment, the write channel selector 160 further includes a signal attenuator 165 for reducing the strength of signals received at the first write/bias circuit 162 from the write channel selector 160.

The first and second write/bias circuits are connected to the forward-write flux transducer 116 and the reverse-write flux transducer 120 respectively of the tape head interface 38, shown in FIG. 5. The write/bias circuits 162 and 164 may include, for example, write/bias integrated circuit chips manufactured by Tandberg Data, and are used to deliver an appropriate bias and data current to the tape head interface 38.

To enable the TDI 26 to "read" from the tape drive head 39 (i.e. to simulate writing to an actual tape by the tape drive head 39), the forward-read flux transducer 114 and the reverse-read flux transducer 118 are connected to first and second signal conditioning circuits 166 and 168 respectively. Each signal conditioning circuit includes a pre-amplifier for amplifying the voltage of signals produced by the flux transducers, and a phase correction network for providing an appropriate phase delay to high frequency components of signals from the flux transducers. The first and second signal conditioning circuits 166 and 168 are connected to a read channel selector 170, which is connected to a filter-amplifier-separator (FAS) circuit 172. The FAS circuit is used to perform filtering and amplification operations on the read signal from the read channel selector 170, to generate a clock signal based on the read signal, and to check for bitshift during a read. The FAS circuit 172 may include, for example, a read hybrid integrated circuit and a data separator hybrid integrated circuit manufactured by Tandberg Data. The FAS circuit 172 is connected to the FPGA 154.

The microprocessor 132 has an input/output (I/O) port shown generally at 169, through which the processor circuit is in communication with the upload/download switch 41, the tape position indicator simulator 60, the drive roller monitor 52, the tape drive head position detector 43, the write channel selector 160 and the read channel selector 170. Specifically, the I/O port includes an upload/download switch register 173 for storing a bit representing the state of the upload/download switch 41, a tape drive head position sensor register 174 for storing digital values representing signals received from the first and second microswitches 44 and 46 of the tape drive head position detector 43, and a drive roller monitor register 175 for storing digital values representing signals received from the first and second sensors 56 and 58 of the drive roller monitor 52. The I/O port 169 further includes a tape emulator register 176 for storing a digital value in response to which control signals are output to the first and second IR LEDs 62 and 64 of the tape emulator 59, and a channel selector register 177 for storing a digital value in response to which control signals are output to the write and read channel selectors 160 and 170.

Operation

Figure 9:
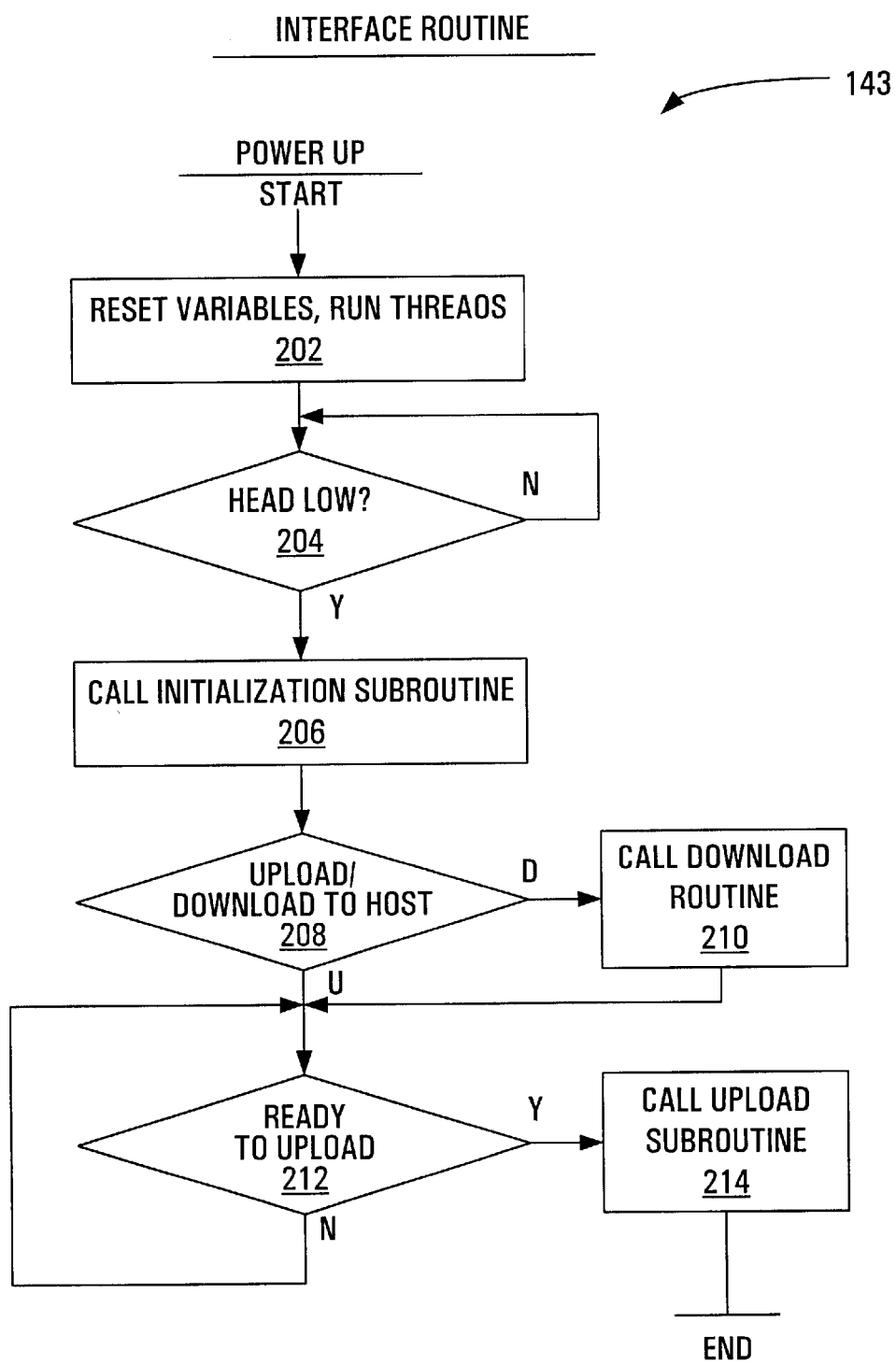
FIG. 9 is a flowchart of an interface routine executed by a processor circuit of the tape drive interface.

Referring to FIGS. 8 and 9, the interface routine is shown generally at 143. The interface routine is initiated upon power-up of the processor circuit 42 and begins with a first block 202 which directs the microprocessor 132 to reset variables in the RAM 140 and to run the emulator/detector thread 184 and the track number thread 192 shown in FIGS. 12 and 17 respectively.

After initiating the threads, block 204 directs the microprocessor 132 to read the tape drive head position sensor register 174 to determine whether or not the tape drive head 39 is in a low or first position. If not, the microprocessor 132 remains in a loop continually checking the tape drive head position sensor register 174 to determine whether or not the tape drive head has reached a lowest point.

Figure 10:
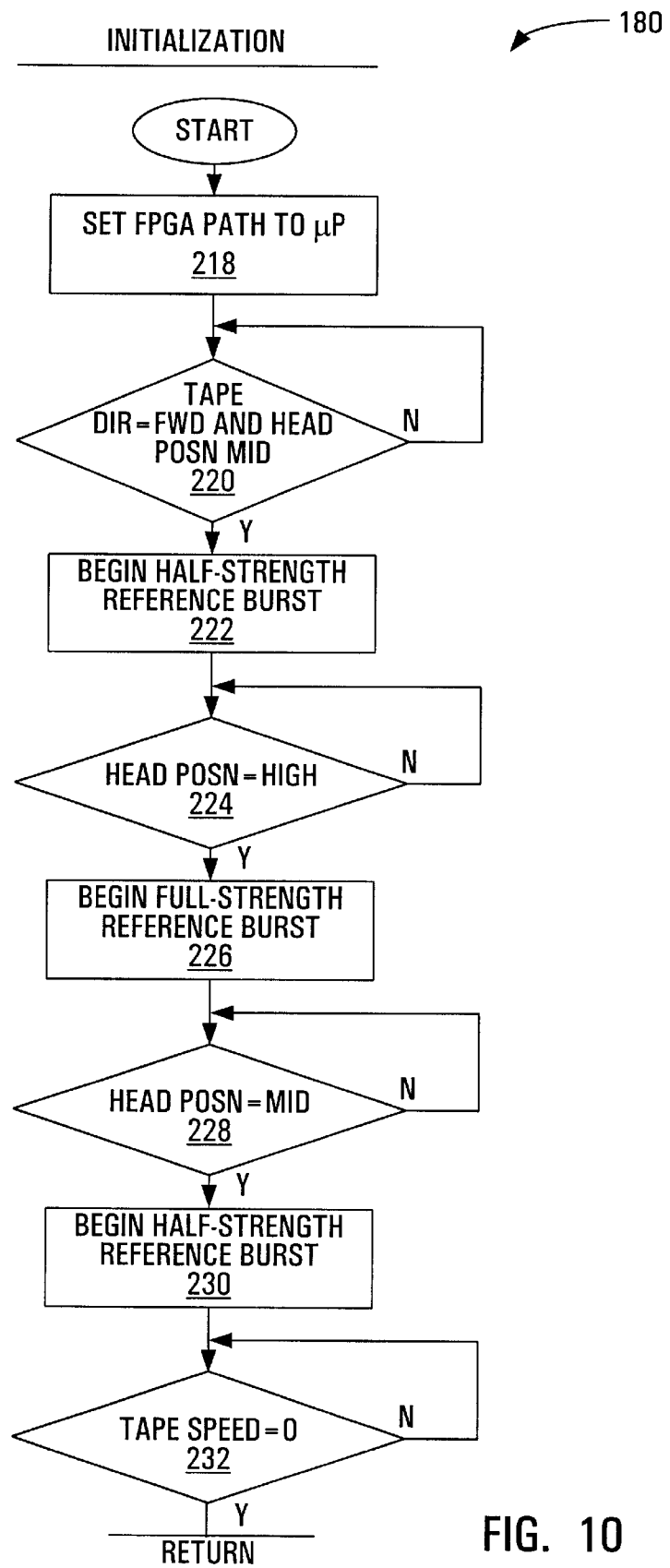
FIG. 10 is a flowchart of an initialization subroutine executed by the processor circuit.

When the head has reached this low point, block 206 directs the microprocessor 132 to call the initialization subroutine 180 shown in FIG. 10.

Referring to FIGS. 8 and 10, the initialization subroutine is shown generally at 180 and begins with a first block 218 which directs the microprocessor 132 to write to the FPGA 154 to cause it to permit data to be received from the microprocessor 132.

Block 220 then directs the microprocessor 132 to read the contents of drive roller monitor register 175 and the contents of the tape drive head position sensor register 174 to determine whether or not the tape drive is attempting to advance in a forward direction and the tape drive head is disposed in the mid position (i.e. the second pre-defined position). If not, the microprocessor 132 continues to wait until such conditions are detected.

When such conditions are detected, block 222 directs the microprocessor 132 to begin a half strength reference burst by sending signals to the flux transducers 116 and 120 and the signal attenuator 165 to cause half strength flux transitions to occur in the vicinity of the forward read gap of the tape drive head.

The half strength reference burst is continually presented to the tape drive head 39 while the microprocessor 132 monitors the tape drive head position sensor register 174 to determine when the tape drive head position detector 43 indicates the tape drive head is in the high position (i.e. the third pre-defined position), as indicated by block 224.

Block 226 then directs the microprocessor 132 to write to the FPGA to send signals to the flux transducers 116 and 120 and the signal attenuator 165 to cause a full strength reference burst of flux transitions to occur. Block 228 then directs the microprocessor 132 to continue the full strength reference burst until the tape drive head reaches the mid position again and then block 230 directs the microprocessor 132 to begin a half strength reference burst which is continued by block 232 until a read of the drive roller monitor register 175 indicates that the tape speed is zero. The initialization subroutine 180 is thus completed.

Referring back to FIGS. 8 and 9, upon completion of the initialization subroutine 180 at block 206, block 208 directs the microprocessor 132 to read the contents of the upload/download switch register 173 to determine the position of the upload/download switch 41. If the upload/download switch has been set to the download position, the microprocessor is directed to block 210 where it calls the download subroutine 182. On the other hand, if the upload/download switch is set to the upload position, the microprocessor is directed to blocks 212 and 214 which direct the microprocessor to wait until the upload ready flag 145 has been set by the COMM Rx thread 188 and then to call the upload subroutine 186 if data has been received and is encoded and ready to be sent to the tape drive.

Downloading from Tape Drive to Second Device

Figure 11:
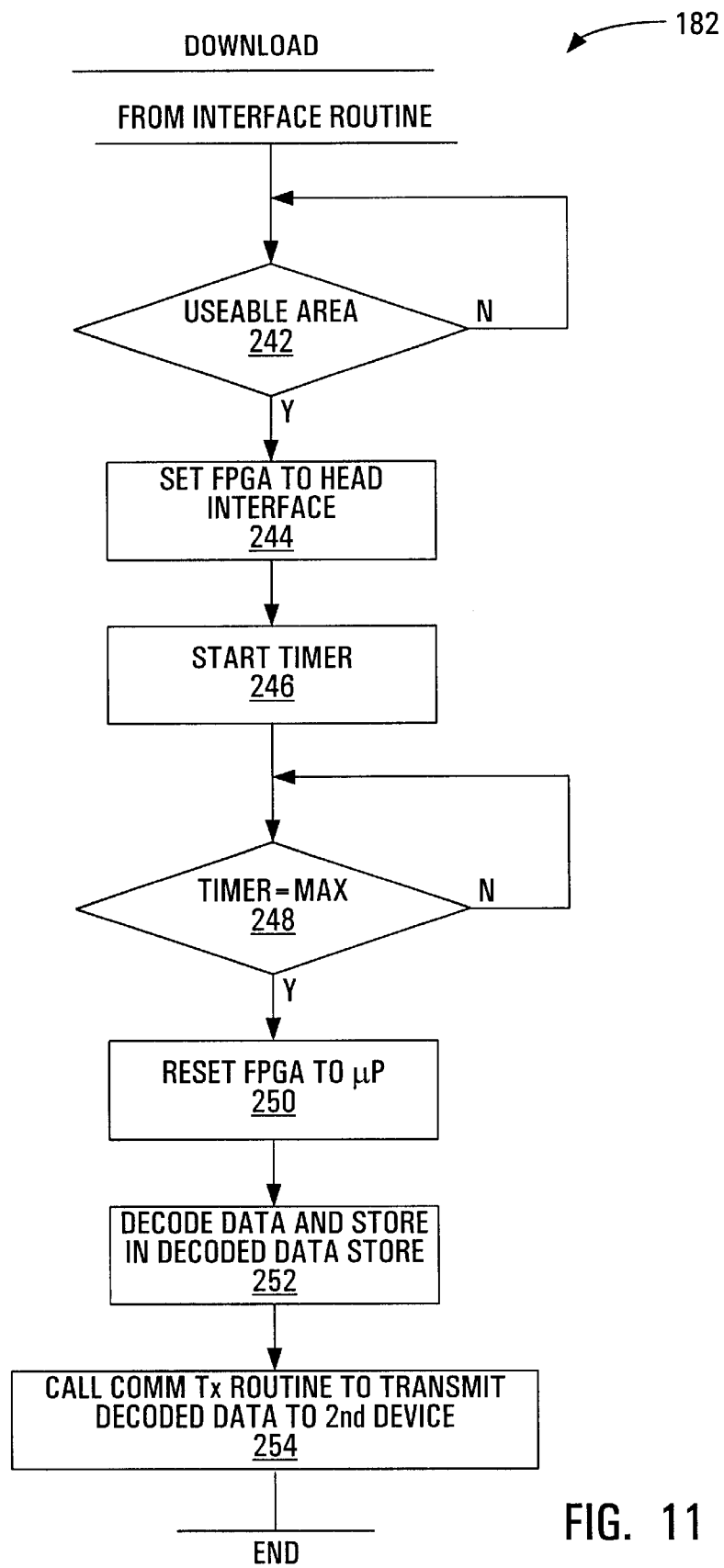
FIG. 11 is a flowchart of a download subroutine executed by the processor circuit of FIG. 8.

Referring to FIGS. 8 and 11, the download subroutine is shown generally at 182. The download subroutine begins with a first block 242 which directs the microprocessor 132 to determine whether or not the current tape position is within a useable area of the tape.

To determine whether or not the current tape position corresponds to a useable area, the microprocessor 132 reads the tape position register 146. The tape position register 146 is maintained and updated by the emulator/detector thread 184.

Figure 12:
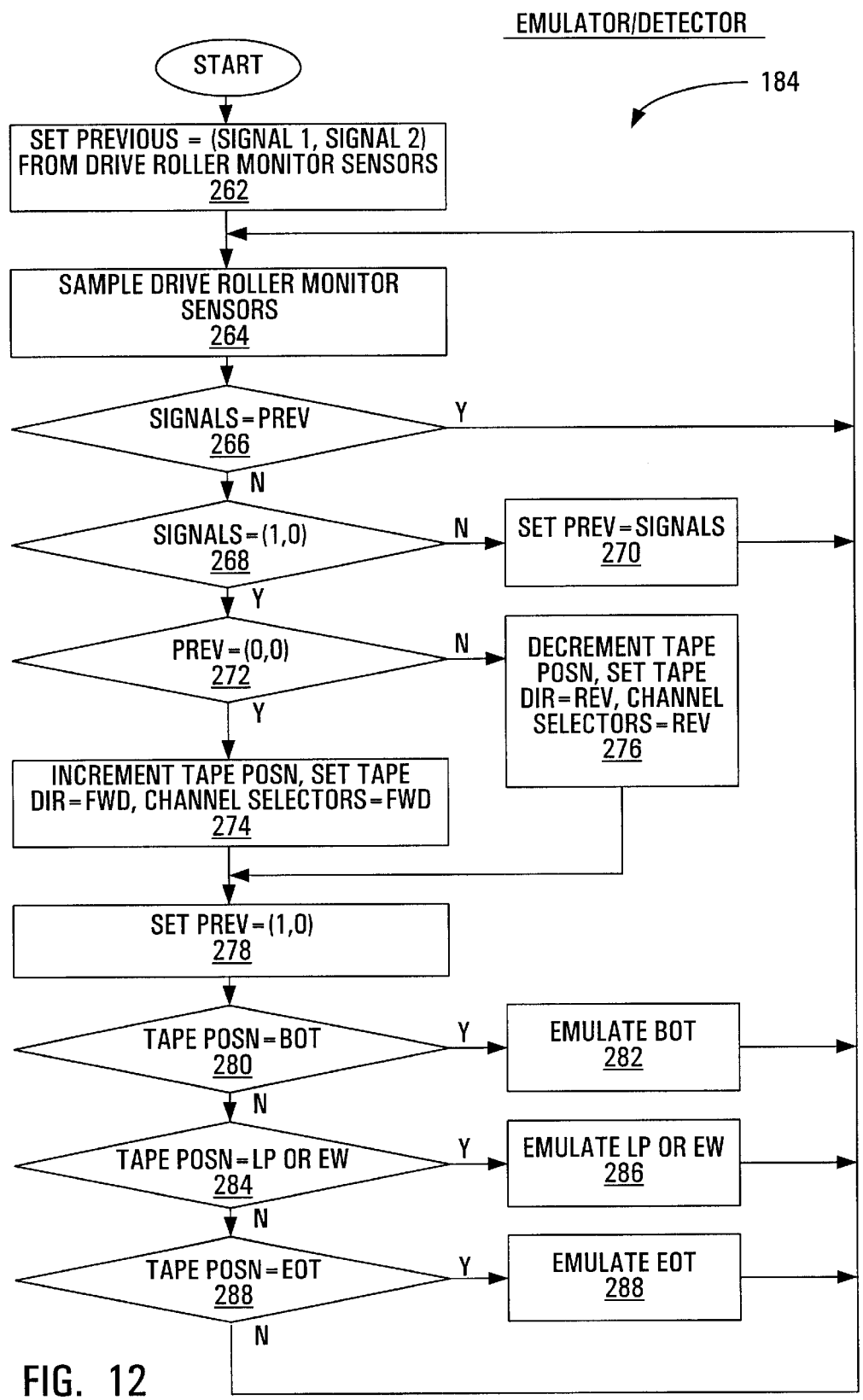
FIG. 12 is a flowchart of an emulator/detector thread executed by the processor circuit.

The emulator/detector thread is shown generally at 184 in FIGS. 8 and 12 and begins with a first block 262 which directs the microprocessor 132 to set the contents of the previous value register 147 equal to the current states of the signals received at the drive roller monitor register 175 from the drive roller monitor 52.

Block 264 then directs the microprocessor 132 to read the drive roller monitor register 175 to determine the current state of the driver roller monitor sensors.

Block 266 then directs the microprocessor 132 to read the previous value register 147 to determine whether or not the current states of the drive roller monitor signals are the same as the previous state of the drive roller monitor signals. If so, the drive roller 74 is assumed to be at rest or to have not yet completed a quarter rotation and therefore, the microprocessor remains in a loop continually sampling the drive roller monitor register 175 until a change in signals has occurred.

When a change in signals has occurred, block 268 directs the microprocessor 132 to determine whether the signals represented by the contents of the drive roller monitor register 175 equal a first predefined value, in this embodiment, (1,0). If the signals are not equal to this predefined value, block 270 directs the microprocessor to store the current value of the signals to the previous value register 147.

If the signals are equal to the predefined value, block 272 directs the microprocessor 132 to determine whether or not the contents of the previous value register 147 are equal to a second predefined value, in this embodiment, (0,0). If so, the microprocessor is directed to block 274 which causes it to increment the contents of the tape position register 146, to set the contents of the tape direction register 152 equal to a code representing a forward direction and to write a code to the channel selector register 177 to cause the write and read channel selectors 160 and 170 to place the flux transducers 114 and 116 into operation. Conversely, if at block 272 the contents of the previous value register 147 are not equal to (0,0), block 276 directs the microprocessor to decrement the contents of the tape position register 146, to set the contents of the tape direction register 152 equal to a code representing a reverse direction and to write a code to the channel selector register 177 to cause the write and read channel selectors 160 and 170 to render the flux transducers 118 and 120 active.

The microprocessor 132 is then directed to block 278 which causes it to write the previously sampled signal value into the previous value register 147. The microprocessor is then directed to block 280 which directs it to read the tape position register 146 to determine whether or not the tape drive is expecting a tape at the beginning of tape (BOT) position. If so, then block 282 directs the microprocessor to write to the tape emulator register 176 to flash the first and second IR LEDs 62 and 64 of the tape emulator 59 according to a beginning of tape sequence, detectable by the tape drive. The microprocessor is then directed back to block 264 as described above.

If the contents of the tape position register 146 do not indicate a beginning of tape position, the microprocessor 132 is directed to block 284 where it determines whether or not the contents of the tape position register 146 correspond to a load point or an early warning position. If so, then the microprocessor 132 is directed to block 286 which causes it to flash the first IR LED 62 of the tape emulator 59 according to a load point or early warning flash sequence detectable by the tape drive. The microprocessor is then directed back to block 264 described above.

If the contents of the tape position register 146 do not correspond to a load point or an early warning position, the microprocessor 132 is directed to block 288 where it determines whether or not the contents of the tape position register correspond to an end of tape position. If so, then the microprocessor is directed to block 288 where it writes to the tape emulator register 176 to flash the second IR LED 64 corresponding to a flash sequence expected by the tape drive when a tape reaches a fully unwound position. The microprocessor is then directed back to block 264 described above.

If at block 288 the tape position register 146 does not indicate an end of tape position, the microprocessor 132 is directed directly to block 264 described above.

In the above manner, the tape position register 146 is updated to keep track of a tape position anticipated by the tape drive, the direction of intended tape travel by the tape drive is determined and flux transducers of the tape head interface are selected according to the expected direction of tape travel intended by the tape drive. In addition, on the basis of the contents of the tape position register 146, the microprocessor 132 determines whether or not beginning of tape, load point or early warning or end of tape emulation signals are to be presented to the tape drive.

Referring back to FIGS. 8 and 11, at block 242, the microprocessor 132 determines whether or not the tape drive expects to be in communication with a useable area of the tape by reading the contents of the tape position register 146 to determine whether or not the contents represent a tape position between end points of the tape.

Block 244 then directs the microprocessor 132 to write to the FPGA 154 to cause it to permit signals from the flux transducers 114 and 118 to be received and stored in the hard drive 156.

Referring back to FIGS. 8 and 11, block 246 then directs the microprocessor 132 to start a timer having a maximum timeout value corresponding to the time it would take to download an entire tape of data.

Block 248 then directs the microprocessor 132 to read the timer register 148 to determine whether or not the timer has timed out and if not, to remain in a loop until the timer does time out. During this period, flux transitions produced by the tape drive head are sensed by the flux transducers 114 or 118, depending upon the direction of intended tape travel by the tape drive and are converted into electrical signals and are conditioned by the first and second signal conditioning circuits 166 and 168. These signal conditioning circuits produce analog signals which are converted by the FAS circuit 172 into digital signals which are transmitted through the FPGA 154 into the encoded block store 155 in the hard drive 156.

Referring to FIGS. 8 and 11, when the timer times out at block 248, block 250 directs the microprocessor 132 to send signals to the FPGA to permit the microprocessor 132 to have access to the encoded block store 155.

Block 252 then directs the microprocessor 132 to decode the data in the encoded block store 155 and store such decoded data in the decoded data store 157 in the hard drive 156.

Block 254 then directs the microprocessor 132 to call a communications transmit routine which causes the decoded data stored in the decoded data store 157 to be transmitted using any desired communications protocol to the second device 31 shown in FIG. 1.

Figure 13:
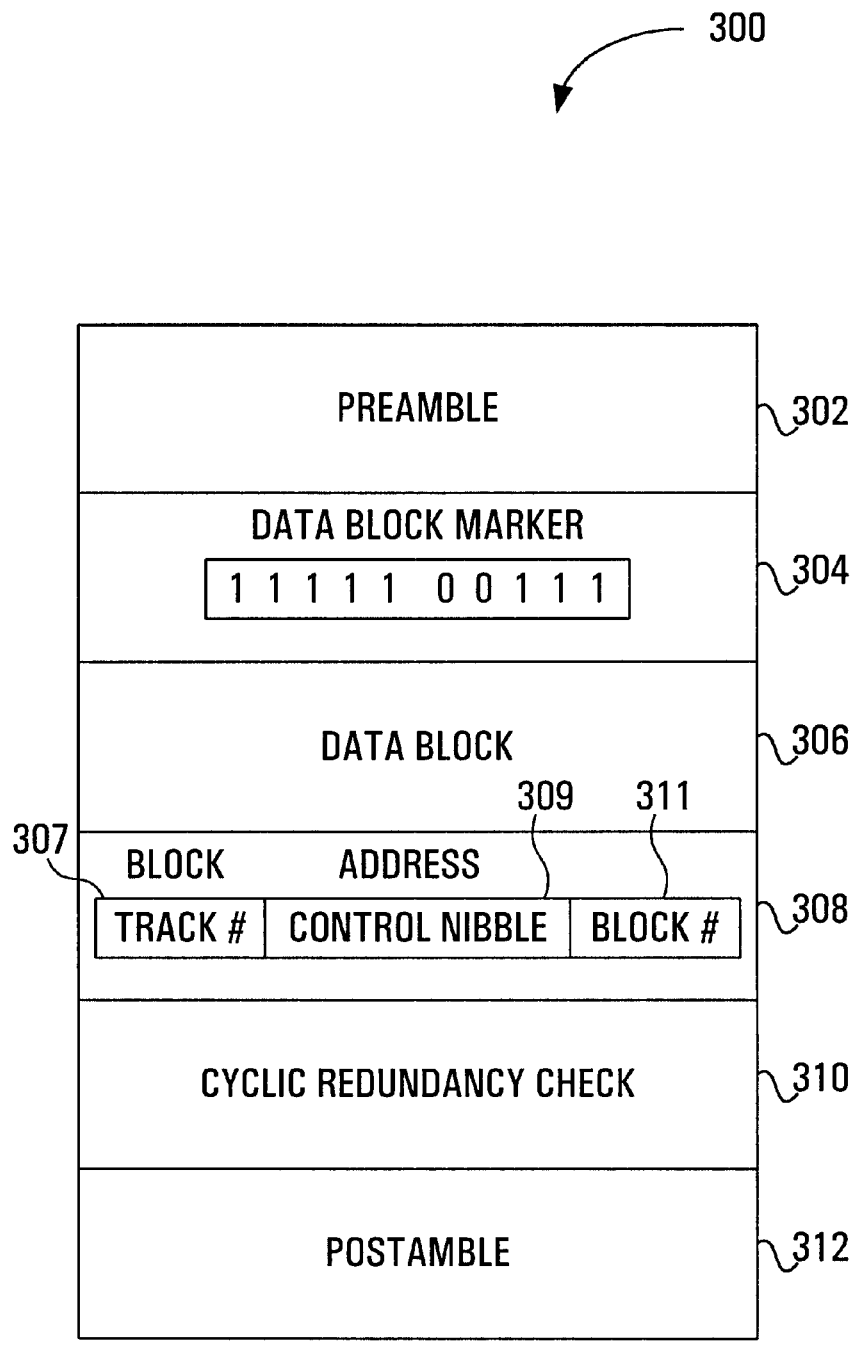
FIG. 13 is a schematic representation of a data block communicated to or by the tape head interface shown in FIG. 6, according to the prior art.

Effectively, referring to FIGS. 8 and 13, successive blocks of GCR encoded data are received from the tape drive and are stored in the encoded block store 155.

Referring to FIGS. 8 and 13, the format of the data received from the tape drive interface is shown generally at 300 and includes a preamble 302, a data block marker 304, a data block 306, a block address 308, a cyclic redundancy check 310 and a postamble 312. The preamble 302 and the postamble 312 are predefined sequences of bits in accordance with the QIC standard. The data block marker 304, the data block 306, the block address 308 and the cyclic redundancy check 310 are encoded in a run length limited code, which in this embodiment is a group code recording (GCR) code. Decoding of these fields 304, 306, 308 and 310 from the GCR code to raw-data occurs according to conventional GCR decoding algorithms. The data that has been converted into raw data form, is that which forms payload data in communications packets sent according to any communications protocol, to the second device 31 shown in FIG. 1. Alternatively, if desired, only the contents of the data block 306 may be decoded and sent to the second device.

Referring back to FIGS. 8 and 9, upon completion of the download subroutine 182 at block 210, or, upon determining from the contents of the upload/download switch register 173 that the upload/download switch 41 is set to the upload position, the microprocessor 132 is directed to block 212 where it reads the contents of the upload ready flag 145 to determine whether or not data received from the second device is ready to be uploaded to the tape drive.

Upon completion of the download subroutine 182, it is expected that the microprocessor 132 would remain in block 212 until the power is shut off and the interface is removed from the tape drive. Otherwise, if the upload/download switch 41 has been set to upload, when the microprocessor determines that the set upload ready flag 145 is set, it is directed by block 214 to call the upload subroutine 186.

Uploading to Tape Drive from Second Device

Figure 14:
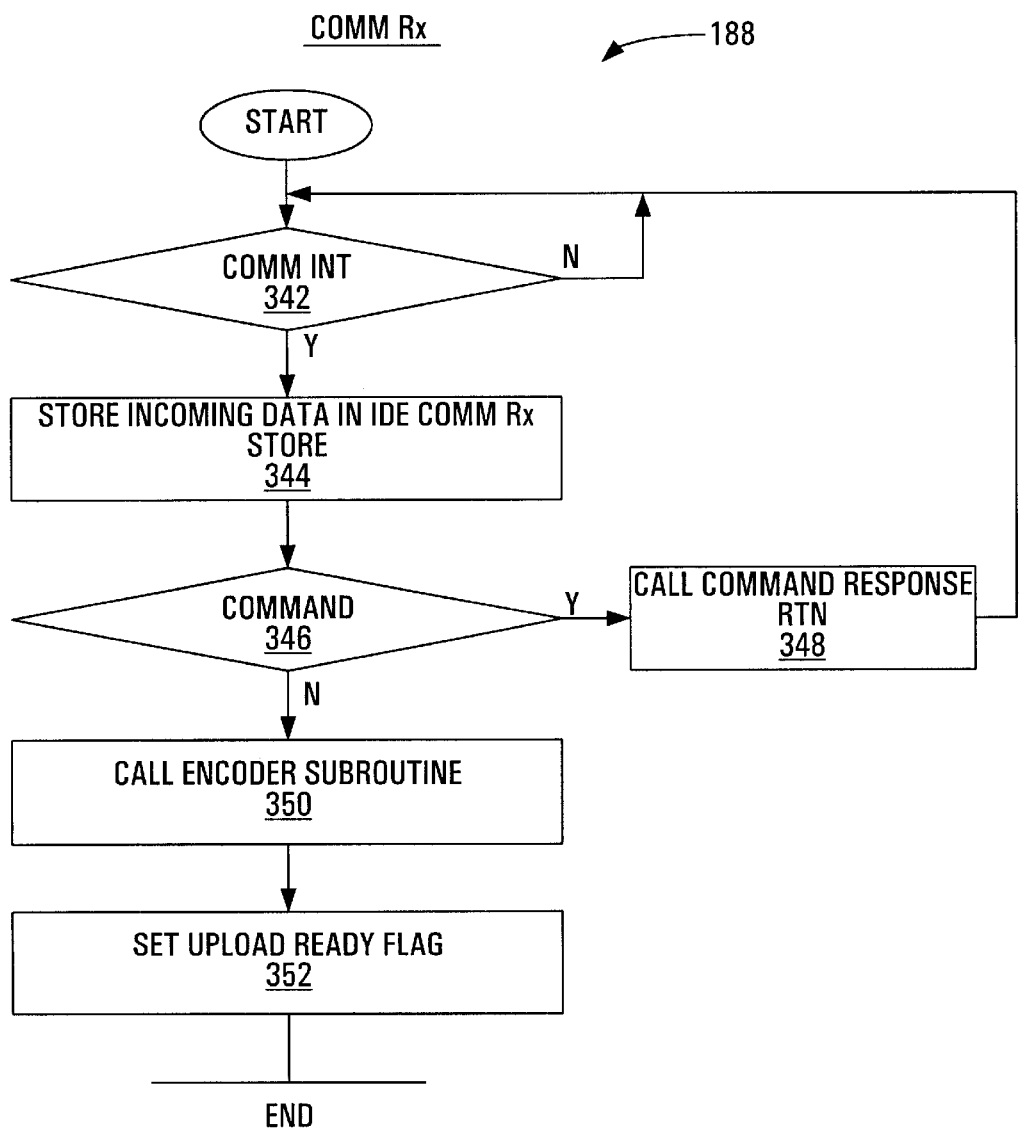
FIG. 14 is a flowchart of a communications receive thread executed by the processor circuit.

The upload ready flag 145 is set by the COMM Rx thread 188 shown in FIG. 14.

Referring to FIGS. 8 and 14, the COMM Rx thread is shown generally at 188. The COMM Rx thread begins with a first block 342 which directs the microprocessor 132 to wait until a communications interrupt is received.

When a communications interrupt is received, block 344 directs the microprocessor 132 to apply conventional receive communications handling routines to receive and store raw data in the decoded data store 157 of the hard drive 156.

Block 346 then directs the microprocessor 132 to read the contents of a predefined location in the decoded data store to determine whether or not a command, or a set of commands has been received. If a command has been received, block 348 directs the microprocessor 132 to call the command response subroutine 194 shown in FIG. 8, which directs the microprocessor to respond to the command. Upon completion of such response, the microprocessor is directed back to block 342.

If no command has been received, then the microprocessor 132 is directed to block 350 where it is directed to the encoder subroutine 190.

Figure 15:
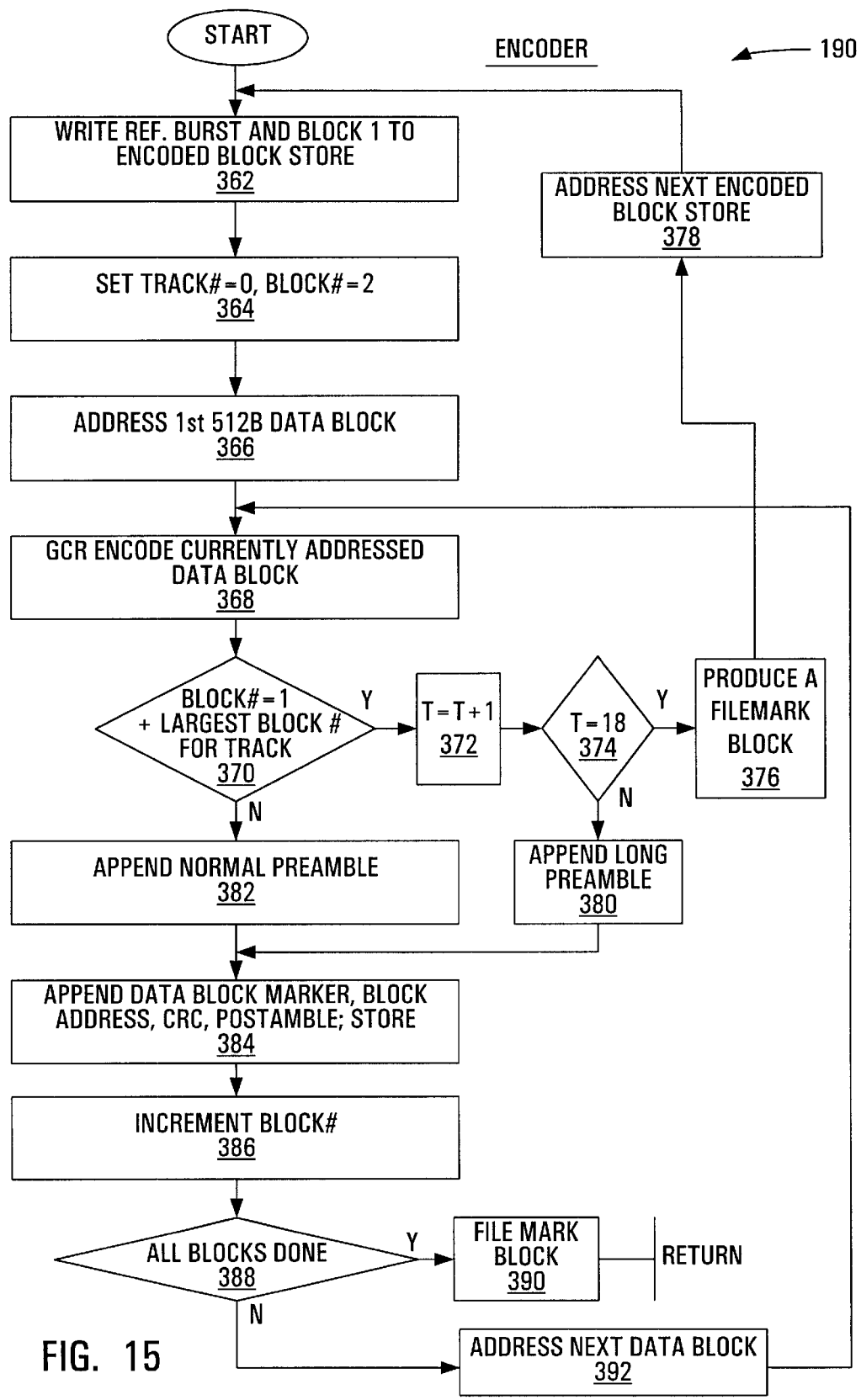
FIG. 15 is a flowchart of an encoder subroutine executed by the processor circuit.

Referring to FIGS. 8 and 15, the encoder subroutine is shown generally at 190. The encoder subroutine begins with block 362 which directs the microprocessor 132 to write a predefined reference burst data sequence and a predefined first block to the encoded block store 155. Block 364 then directs the microprocessor to set the contents of the track counter 149 to zero and to set the contents of the block number counter 150 to the value 2. This serves the purpose of initializing the track and block number counters for later calculation of track and block number codes to be appended to data blocks.

Block 366 then directs the microprocessor 132 to address the first 512 bytes of the decoded data store and to apply a conventional GCR algorithm to encode the 512 bytes into a group code recording format. The encoded block of data so produced is stored in the encoded block store 155 in a location corresponding to the data block 306 shown in FIG. 13.

Block 370 then directs the microprocessor 132 to determine whether the current contents of the block number counter 150 are one greater than the number of blocks intended for the track indicated by the contents of the track counter 149 and if so, to advance to block 372 whereupon the contents of the track counter 149 are incremented.

Block 374 then directs the microprocessor 132 to determine whether the contents of the track counter 149 are equal to the number of tracks on the tape. In this embodiment there are 18 tracks numbered 0 to 17. If the track counter contains the value 18, then the microprocessor 132 is directed to block 376 which causes it to produce a file mark block in accordance with the QIC-150 standard in the encoded block store 155, and then to proceed to block 378 where it addresses the second encoded block store 159 in the hard drive 156, if any. It will be appreciated that a plurality of encoded block stores may be included within the hard drive 156 and each successive encoded block store may act as a separate tape cartridge. Consequently, upon addressing the next encoded block store, the microprocessor is directed back to block 362 where it begins the encoding process to produce a second encoded block store.

If at block 374 the current contents of the track counter 149 are not equal to 18, block 380 directs the microprocessor 132 to append a long preamble to the encoded block store 155.

If at block 370, the block number in the block number counter 150 is not one greater than the predetermined number of blocks for the track, the microprocessor 132 is directed to block 382 where it appends a normal length preamble to the encoded block store 155.

The microprocessor 132 is then directed to block 384 which causes it to produce a data block marker, a block address and a cyclic redundancy check in fields by the same names as shown in FIG. 13. To produce the block address 308, the current contents of the track counter 149 are GCR-encoded and stored as the contents of a track number field 307. Similarly, the contents of the block number counter 150 are GCR-encoded and stored as the block number in a block number field 311.

It will be appreciated that from the foregoing, an entire encoded block having the format shown in FIG. 13 is produced in the encoded block store. Referring back to FIGS. 8 and 15, the microprocessor 132 is then directed at block 386 to increment the contents of the block number counter 150 and then to determine whether or not all blocks have been produced. In other words, if no more decoded data is stored in the decoded data store 157, then all blocks must have been encoded. If so, then block 390 directs the microprocessor 132 to produce a file mark block and store same in the encoded block store 155. The encoder subroutine 190 is then completed and processing returns to the COMM Rx thread 188. If on the other hand, at block 388, all blocks of data have not been encoded, block 392 directs the microprocessor to address the next data block in the decoded data store 157 and resume processing at block 368 where it encodes the currently addressed data block as described above. In the above manner, successive decoded blocks of data are encoded and stored in the encoded block store 155 of the hard drive 156, until the same number of blocks as would be stored on a tape is stored in the encoded block store. When this occurs, the encoder subroutine 190 is completed and the microprocessor 132 is directed back to the COMM Rx thread 188 shown in FIG. 14.

Upon completion of the encoder subroutine 190, block 352 directs the microprocessor 132 to set the upload ready flag 145.

Referring back to FIGS. 8 and 9, when the upload ready flag 145 is set active block 212 directs the microprocessor 132 to call the upload subroutine 186.

Figure 16:
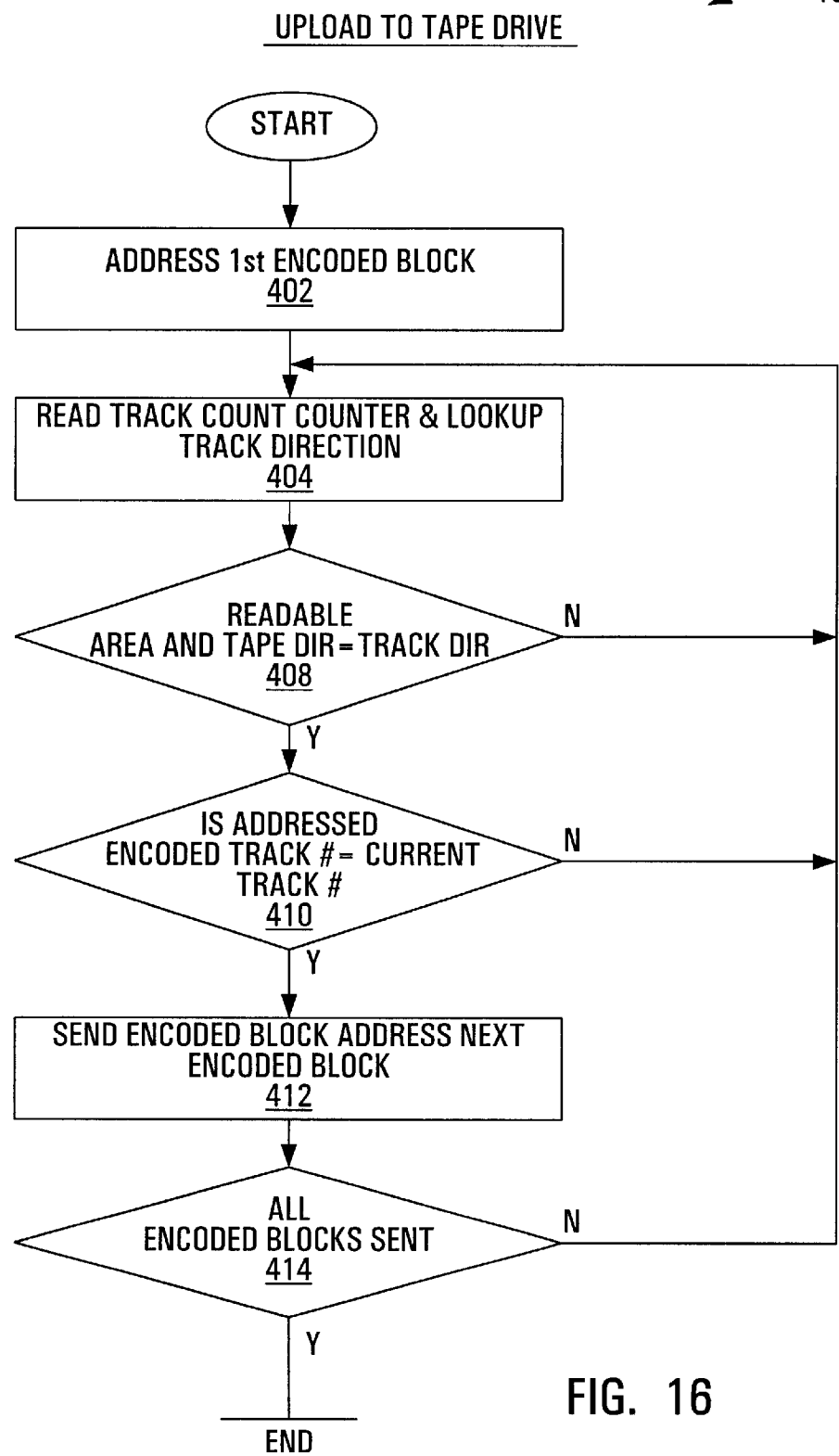
FIG. 16 is a flowchart of an upload subroutine executed by the processor circuit.

Referring to FIGS. 8 and 16, the upload subroutine is shown generally at 186. The upload subroutine is for uploading the contents of the encoded block store 155 directly from the hard drive 156, through the FPGA 154, to the tape drive head, through the flux transducers 116 and 120, as appropriate.

The upload subroutine 186 begins with block 402 which directs the microprocessor 132 to address the first encoded block in the encoded block store 155.

Figure 17:
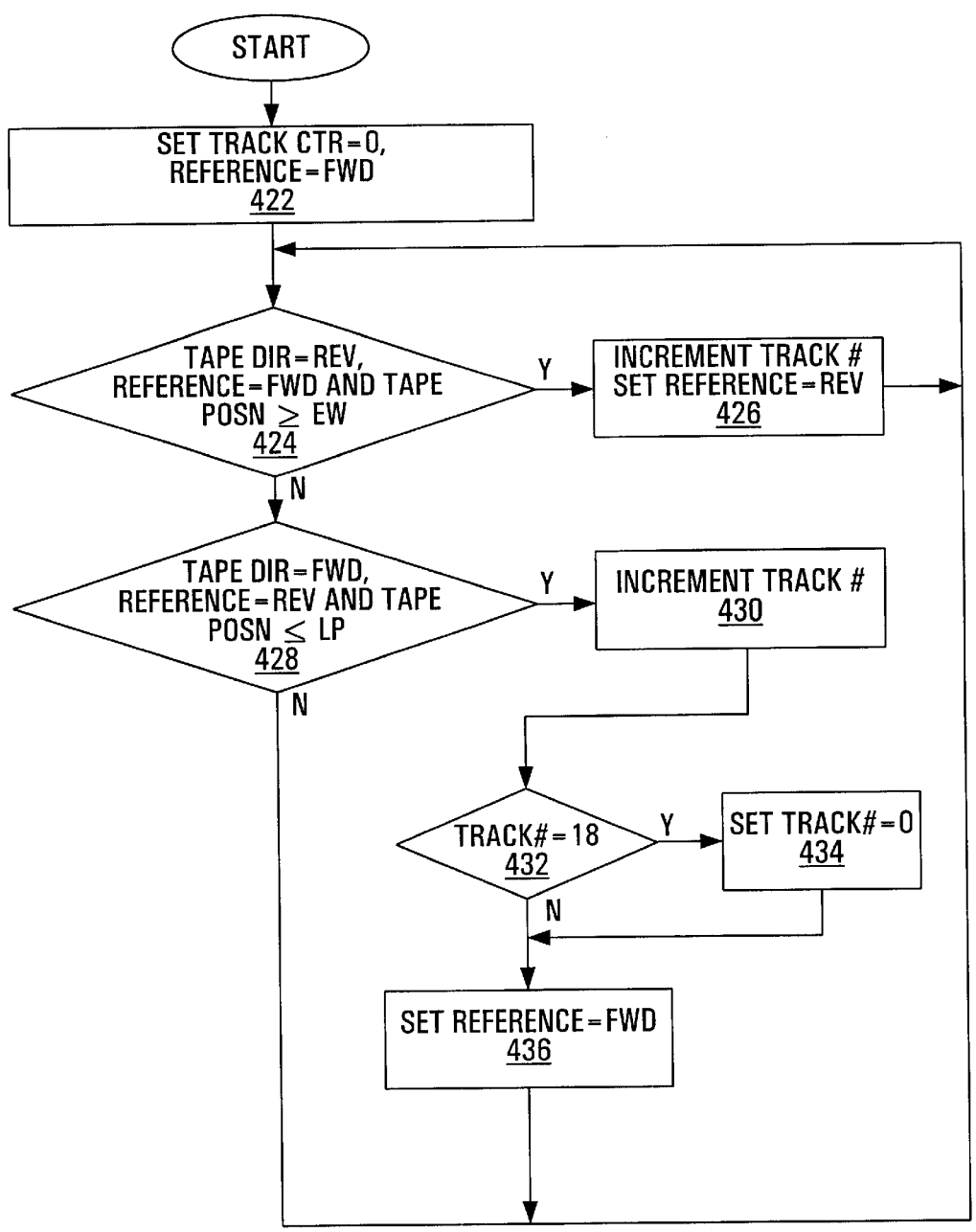
FIG. 17 is a flowchart of a track number thread executed by the processor circuit.

Simultaneously, the track number thread shown at 192 in FIG. 17 is run. Referring to FIGS. 8 and 17, the track number thread begins with a first block 422 which sets the contents of the expected track counter 151 to zero and sets the contents of the reference register 153 to a code representing a forward value.

Block 424 then directs the microprocessor 132 to determine, by reading the tape direction register 152 and the tape position register 146 set by the emulator/detector thread 184 shown in FIG. 12, whether or not the tape direction is equal to reverse, and the tape position value is greater than the early warning position and the reference register 153 maintained by the track number thread 192 contains a forward code. If so, then block 426 directs the microprocessor 132 to increment the contents of the expected track counter 151 and to load a code representing a reverse direction into the reference register 153. When this has been done, the microprocessor 132 is directed back to block 424.

If at block 424 the conditions stated therein are negative, then block 428 directs the microprocessor 132 to read the contents of the tape position register 146 and the tape direction register 152 to determine whether or not the tape direction register holds a forward direction code and whether or not the tape position register 146 indicates a value less than or equal to the load point position and whether or not the contents of the reference register 153 hold a reverse direction code. If so, then block 430 directs the microprocessor 132 to increment the contents of the expected track counter 151 and block 432 directs the microprocessor to determine whether or not the contents of the expected track counter are equal to 18. If so, then block 434 directs the microprocessor to set the contents of the expected track counter 151 equal to 0 and the microprocessor is directed to block 436 where it sets the contents of the reference register 153 with a forward direction code.

Effectively, the contents of the expected track counter 151 indicate the current track intended to be read by the tape drive head 39 at any given time.

Referring back to FIG. 16, block 404 directs the microprocessor 132 to read the contents of the expected track counter 151 and to use a look up table (not shown), to determine the corresponding track direction.

Block 408 then directs the microprocessor 132 to read the contents of the tape position register 146 and to determine whether or not the contents of the tape position register 146 indicate a value in a readable area of the tape. If so, then the microprocessor 132 is further directed to determine whether or not the contents of the tape direction register 152 hold the same direction code as the track direction determined in block 404. If any of these conditions is not true, then the microprocessor is directed back to block 404. If each of these conditions is true, then the microprocessor is directed to block 410 where it reads the track number field 307 of the currently addressed encoded block in the encoded block store 155 to determine whether or not the currently addressed block has the same track number as the contents of the expected track counter 151. If not, the microprocessor 132 is directed back to block 404. If so, then the microprocessor is directed to block 412 where it transmits the entire contents of the currently addressed encoded block to the digital to analog converter 158 to produce analog signals which are presented through the write channel selector 160, to the write bias circuits 162 or 164 to drive flux transducers 116 or 120, depending on which has been selected, according to the track direction.

After sending this information block 414 directs the microprocessor 132 to determine whether or not all encoded blocks of the encoded block store have been sent to the tape drive. If not, the microprocessor is directed back to block 404. If so, the upload subroutine 186 is ended and processing is returned to the interface routine 143 shown in FIG. 9, and the interface routine is ended.

Alternatives:

Offboard Decoder

Referring back to FIGS. 2 and 8, it will be appreciated that the processor circuit 42 need not be entirely contained within the housing 36 of the TDI 26. For example, in a second embodiment of the invention, various components of the processor circuit 42, such as the RAM 140, the FLASH memory 141, the FPGA 154 and the hard drive 156 may be contained in an offboard decoder, and may communicate with the remaining components of the TDI 26 via a second cable, which may be a thin mylar ribbon cable, for example. The offboard decoder may in turn communicate with the remote device via the cable 28 and COMM port 134, as described above.

Other Tape Standards

In the foregoing illustration of an embodiment of the invention, the QIC-150 tape standard was chosen for ease of illustration. However, any suitable standard or type of tape drive may be substituted therefor.

Tape Head Interface

Figure 18:
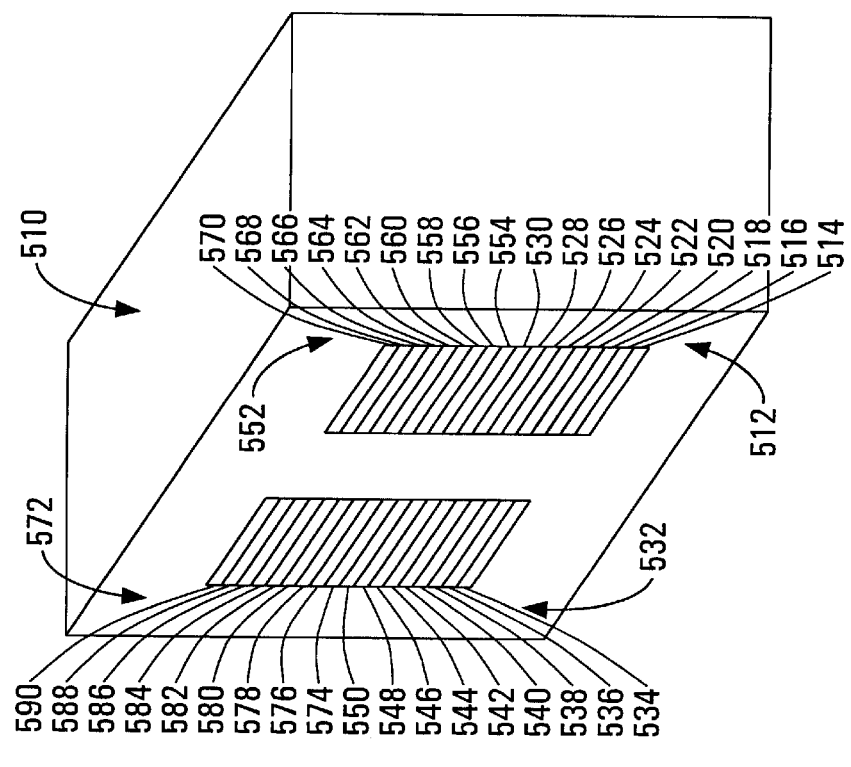
FIG. 18 is a schematic representation of a tape head interface according to an alternative embodiment of the invention.
Figure 18:
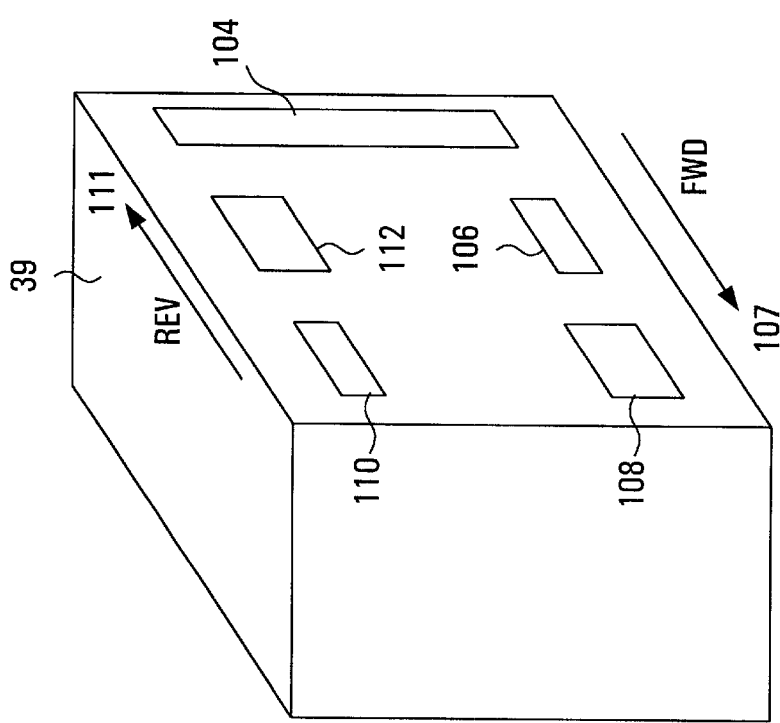

Referring to FIG. 18, a tape head interface according to an alternative embodiment of the invention is shown generally at 510. A forward-write flux transducer 512 produces magnetic flux transitions detectable by the forward read gap 108 of the tape drive head 39, to allow the tape drive 24 to "read" information from the TDI 26. The forward-write flux transducer 512 includes individual flux transducers 514, 516, 518, 520, 522, 524, 526, 528 and 530, which have transverse widths and relative transverse positions corresponding to those of tracks 16, 14, 4, 0, 8, 10, 6, 2 and 12 respectively of a QIC-150 tape. Similarly, a reverse-write flux transducer 572 produces flux reversals detectable by the reverse read gap 112 of the tape drive head 39. The reverse-write flux transducer 572 includes individual flux transducers 574, 576, 578, 580, 582, 584, 586, 588 and 590, which have transverse widths and relative transverse positions corresponding to those of tracks 17, 9, 7, 11, 3, 1, 5, 15 and 13 respectively of a QIC-150 tape.

The tape head interface 510 also includes a forward-read flux transducer 532 for detecting magnetic flux reversals produced by the forward write gap 106 of the tape drive head 39, and a reverse-read flux transducer 552 for detecting flux reversals produced by the reverse write gap 110. The forward-read flux transducer 532 includes individual flux transducers 534, 536, 538, 540, 542, 544, 546, 548, and 550, corresponding respectively to tracks 16, 14, 4, 0, 8, 10, 6, 2 and 12, and the reverse-read flux transducer 552 has individual flux transducers 554, 556, 558, 560, 562, 564, 566, 568 and 570 corresponding respectively to tracks 17, 9, 7, 11, 3, 1, 5, 15 and 13 of a QIC-150 tape.

Thus, in this embodiment, the transducer comprises a plurality of flux transducers, each of the flux transducers having a flux sensitivity area less than or equal to a transverse width of a track of a tape readable by the tape drive.

Referring back to FIG. 8, in this embodiment, a write/bias circuit (not shown) is interposed between the digital to analog converter 158 and the write channel selector 160, and the write/bias circuits 162 and 164 are removed. In this embodiment, the write channel selector 160 has 18 channels, each channel corresponding to a respective one of the 18 individual flux transducers of the forward-write flux transducer 512 and the reverse-write flux transducer 572. Similarly, in this embodiment the read channel selector 170 has 18 channels, each channel corresponding to a respective one of the 18 individual flux transducers of the forward-read flux transducer 532 and the reverse-read flux transducer 552. The microprocessor 132 is programmed to control the write channel selector 160 and the read channel selector 170 to select individual flux transducers corresponding to the track number stored in the track counter 149 in the RAM 140.

While specific embodiments of the invention have been described and illustrated, such embodiments should be considered illustrative of the invention only and not as limiting the invention as construed in accordance with the accompanying claims.

What is claimed is:

1. A method for transferring information between first and second devices, where the first device includes a tape drive having a tape drive head, the method comprising:
   a) positioning a removable tape head interface adjacent the tape drive head;
   b) communicating signals between the tape drive head and said tape head interface;
   c) communicating signals between said tape head interface and the second device;
   d) emulating a tape in said tape drive; and
   e) said removable tape head interface detecting movement of a tape interface mechanism of said tape drive and controlling communication between the tape drive head and said tape head interface in response thereto.

2. A method as claimed in claim 1 further comprising transducing signals between the tape drive head and said tape head interface.

3. A method as claimed in claim 2 wherein transducing comprises producing electrical signals in response to magnetic flux transitions produced by the tape drive head.

4. A method as claimed in claim 3 further comprising decoding said electrical signals to produce decoded electrical signals.

5. A method as claimed in claim 4 further comprising transmitting communication signals in response to said decoded electrical signals.

6. A method as claimed in claim 3 further comprising:
   a) storing data representing said magnetic flux transitions in a memory device; and
   b) transmitting at least some of said data to said second device.

7. A method as claimed in claim 2 wherein transducing comprises producing magnetic flux transitions in response to communication signals received at said tape head interface from a communications interface.

8. A method as claimed in claim 7 wherein producing said flux transitions comprises:
   a) encoding said communication signals to produce encoded electrical signals; and
   b) producing magnetic flux transitions in response to said encoded electrical signals.

9. A method as claimed in claim 2 wherein transducing comprises:
   a) storing data representing electrical signals in a memory device; and
   b) producing magnetic flux transitions at said tape head interface in response to said data.

10. A method as claimed in claim 3 wherein communicating signals between the tape drive head and said tape head interface comprises:
    a) producing electrical signals at at least one of a plurality of transducers in response to flux transitions detected adjacent the tape drive head;
    b) selecting electrical signals from one of said transducers;
    c) producing a coded representation of said selected electrical signals; and
    d) storing said coded representation in a memory device for retrieval by a communications interface.

11. A method as claimed in claim 10 further comprising:
    a) detecting movement of a tape interface mechanism of said tape drive; and
    b) selecting said electrical signals in response to movement of the tape interface mechanism.

12. A method as claimed in claim 11 wherein detecting movement of a tape interface mechanism comprises detecting motion of a drive roller of the tape drive.

13. A method as claimed in claim 12 wherein selecting electrical signals from at least one of said transducers comprises:

a) selecting electrical signals from a first transducing receiver in response to detecting motion of said drive roller in a first direction; and b) selecting electrical signals from a second transducing receiver in response to detecting motion of said drive roller in a second direction.

14. A method as claimed in claim 11 wherein emulating comprises actuating tape position sensors in the tape drive to simulate tape position conditions.

15. A method as claimed in claim 14 wherein actuating tape position sensors comprises directing radiation toward at least one of said tape position sensors.

16. A method as claimed in claim 15 wherein directing radiation comprises producing a flash sequence representing at least one of a beginning of tape marker, a load point marker, an early warning marker, and an end of tape marker.

17. A method as claimed in claim 1 wherein detecting comprises detecting a position of the tape drive head relative to said tape head interface.

18. A method as claimed in claim 17 further comprising producing edge seek response signals for reception by the tape drive head when a first pre-defined position of the tape drive head relative to the tape head interface is detected.

19. A method as claimed in claim 18 further comprising varying an intensity of said edge seek response signals when a second pre-defined position of the tape drive head relative to the tape head interface is detected.

20. A method as claimed in claim 18 wherein producing edge seek response signals comprises producing reference burst signals representing a reference burst written to a tape by the tape drive head when a tape is used in the tape drive.

21. A method as claimed in claim 20 wherein producing edge seek response signals and producing reference burst signals comprise producing magnetic flux transitions detectable by the tape drive head.

22. A method as claimed in claim 1 wherein detecting comprises detecting motion of a tape transport mechanism to determine an intended direction of tape movement produced by the tape drive.

23. An apparatus for transferring information between first and second devices, where the first device includes a tape drive having a tape drive head, the apparatus comprising:

a) a tape head interface removably positionable adjacent the tape drive head to communicate with the tape drive head;

b) a communications interface for communicating signals between said tape head interface and the second device;

c) a tape emulator in communication with said tape head interface, for emulating a tape in said tape drive; and d) said tape head interface comprising a tape drive movement detector for detecting movement of a tape interface mechanism of said tape drive, said tape drive movement detector being operable to control communications between the tape drive head and said tape head interface in response to detected movement of the tape interface mechanism.

24. An apparatus as claimed in claim 23 wherein said communications interface comprises a cable sufficiently thin to enable a door of the tape drive to close when said tape head interface is positioned adjacent the tape drive head.

25. An apparatus as claimed in claim 23 wherein said tape head interface comprises a transducer for transducing signals between the tape drive head and said tape head interface.

26. An apparatus as claimed in claim 25 wherein said transducer comprises at least one flux transducer for producing electrical signals in response to magnetic flux transitions produced by the tape drive head.

27. An apparatus as claimed in claim 25 wherein said transducer comprises at least one flux transducer for producing magnetic flux transitions in response to communication signals received at said tape head interface from said communications interface.

28. An apparatus as claimed in claim 27 wherein said at least one flux transducer has a flux sensitivity area for communicating with the tape drive head over the entire range of transverse motion of a corresponding read gap of the tape drive head.

29. An apparatus as claimed in claim 27 further comprising an encoder in communication with said communications interface and with said tape head interface, for encoding said communication signals to produce encoded electrical signals for receipt by said transducer.

30. An apparatus as claimed in claim 26 wherein said at least one flux transducer has a flux sensitivity area for communicating with the tape drive head over the entire range of transverse motion of a corresponding write gap of the tape drive head.

31. An apparatus as claimed in claim 26 further comprising a decoder in communication with said flux transducer for decoding said electrical signals to produce decoded electrical signals for receipt by said communication interface.

32. An apparatus as claimed in claim 26 further comprising a memory device in communication with said flux transducer for storing data representing said magnetic flux transitions, and in communication with said communications interface for transmitting at least some of said data to said second device.

33. An apparatus as claimed in claim 26 wherein said tape head interface further comprises:

a) a channel selector for selecting electrical signals from one of said at least one flux transducers; and b) a memory device for storing a coded representation of said selected electrical signals for retrieval by said communications interface.

34. An apparatus as claimed in claim 33 wherein said tape drive movement detector is in communication with said channel selector for detecting movement of the tape drive interface mechanism of said tape drive and wherein said channel selector selects said electrical signals in response to signals from said tape drive movement detector.

35. An apparatus as claimed in claim 34 wherein said tape drive movement detector comprises a drive roller monitor for detecting motion of a drive roller of the tape drive.

36. An apparatus as claimed in claim 35 wherein said at least one flux transducer comprises first and second flux transducers.

37. An apparatus as claimed in claim 36 wherein said channel selector is responsive to said drive roller monitor to select electrical signals from said first flux transducer in response to detecting motion of said drive roller in a first direction, and to select electrical signals from said second flux transducer in response to detecting motion of said drive roller in a second direction.

38. An apparatus as claimed in claim 25 wherein said tape head interface further comprises:

a) a memory device for storing data representing electrical signals; and b) at least one flux transducer for producing magnetic flux transitions in response to said data.

39. An apparatus as claimed in claim 25 wherein said transducer comprises a plurality of flux transducers.

40. An apparatus as claimed in claim 39 wherein each of said flux transducers has a flux sensitivity area less than or equal to a transverse width of a track of a tape readable by said tape drive.

41. An apparatus as claimed in claim 25 wherein said transducer comprises a flux transducer having spaced apart read and write flux sensitivity areas.

42. An apparatus as claimed in claim 41 further comprising a transducer motion assembly for maintaining a constant position of said flux transducer relative to the tape drive head.

43. An apparatus as claimed in claim 23 wherein said tape emulator comprises a tape position indicator simulator for actuating tape position sensors in the tape drive to simulate tape position conditions.

44. An apparatus as claimed in claim 43 wherein said tape position indicator simulator comprises first and second irradiance sources for directing radiation toward at least one of said tape position sensors.

45. An apparatus as claimed in claim 44 wherein said first and second irradiance sources comprise first and second infrared light-emitting diodes respectively, for producing a flash sequence representing at least one of a beginning of tape marker, a load point marker, an early warning marker, and an end of tape marker.

46. An apparatus as claimed in claim 23 further comprising a processor circuit in communication with said tape drive movement detector for controlling communication between the tape drive head and said tape head interface in response to signals received from said tape drive movement detector.

47. An apparatus as claimed in claim 46 wherein said tape drive movement detector comprises a tape drive head position detector for detecting a position of the tape drive head relative to said tape head interface.

48. An apparatus as claimed in claim 47 wherein said tape drive head position detector comprises first and second spaced apart microswitches.

49. An apparatus as claimed in claim 48 wherein said tape drive head position detector comprises a plurality of irradiance sources and a plurality of irradiance detectors, each of said irradiance detectors corresponding to a particular one of said plurality of irradiance sources.

50. An apparatus as claimed in claim 42 wherein said processor circuit is programmed to control said tape head interface to produce edge seek response signals for reception by the tape drive head when a first predefined position of the tape drive head relative to the tape head interface is detected by said tape drive head position detector.

51. An apparatus as claimed in claim 50 wherein said processor circuit is programmed to control said tape head interface to vary an intensity of said edge seek response signals when a second pre-defined position of the tape drive head relative to the tape head interface is detected by said tape drive head position detector.

52. An apparatus as claimed in claim 51 wherein said processor circuit is programmed to control said tape head interface to produce reference burst signals representing a reference burst written to a tape by the tape drive head when a tape is used in the tape drive.

53. An apparatus as claimed in claim 52 wherein said tape head interface comprises at least one flux transducer, and wherein said processor circuit is programmed to control said tape head interface to produce said edge seek response signals and said reference burst signals by producing magnetic flux transitions detectable by the tape drive head.

54. An apparatus as claimed in claim 23 wherein said tape drive movement detector comprises a tape transport mechanism detector for detecting motion of a tape transport mechanism to determine an intended direction of tape movement produced by the tape drive.

55. An apparatus as claimed in claim 54 wherein said tape transport mechanism detector comprises a drive roller monitor for detecting motion of a drive roller of the tape drive.

56. An apparatus as claimed in claim 55 wherein said drive roller monitor comprises:

a) a wheel positioned to remain in contact with the drive roller when said tape head interface is positioned adjacent the tape drive head; and b) a position encoder for determining a rotational position of said wheel.

57. An apparatus comprising:

a) a tape drive for communicating with a first device, said tape drive having a tape drive interface mechanism;

b) a tape head interface removably positionable adjacent a tape drive head of the tape drive to communicate with the tape drive head;

c) a communications interface in communication with said tape head interface, for communicating signals between said tape head interface and a second device;

d) a tape emulator in communication with said tape head interface, for emulating a tape in said tape drive; and e) said tape head interface comprising a tape drive movement detector for detecting movement of said tape interface mechanism, said tape drive movement detector being operable to control communications between the tape drive head and said tape head interface in response to detected movement of the tape interface mechanism.

58. An apparatus as claimed in claim 57 wherein said tape head interface comprises a transducer for transducing signals between the tape drive head and said tape head interface.

59. An apparatus for transferring information between first and second devices, where the first device includes a tape drive having a tape drive head, the method comprising:

a) means for communicating with the tape drive head, removably positionable adjacent the tape drive head;

b) means for communicating with the second device;

c) means for emulating a tape in the tape drive; and d) said means for communicating with the tape drive head comprising means for detecting movement of a tape interface mechanism of said tape drive and for controlling communication between the tape drive head and said tape head interface in response thereto.

60. An apparatus as claimed in claim 59 wherein said means for communicating with the tape drive head comprises means for transducing signals.

61. An apparatus as claimed in claim 59 further comprising means for producing edge seek response signals, in communication with said means for detecting movement.

* * * * *

UNITED STATES PATENT AND TRADEMARK OFFICE
CERTIFICATE OF CORRECTION

PATENT NO. : 6,571,205 B1
DATED : May 27, 2003
INVENTOR(S) : Jody Michel Doucet, Mark B. Nadeau and Lauria Elaine Blackwell It is certified that error appears in the above-identified patent and that said Letters Patent is hereby corrected as shown below:

<u>Column 23,</u>
Line 42, "claim 42" should read -- claim 47 --.
Line 45, "predefined" should read -- pre-defined --.

Signed and Sealed this

Twenty-third Day of December, 2003

JAMES E. ROGAN
*Director of the United States Patent and Trademark Office*